United States Patent
Akiyama

(10) Patent No.: US 11,523,093 B2
(45) Date of Patent: Dec. 6, 2022

(54) LIGHT SOURCE APPARATUS AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/475,842

(22) Filed: Sep. 15, 2021

(65) Prior Publication Data

US 2022/0086407 A1 Mar. 17, 2022

(30) Foreign Application Priority Data

Sep. 16, 2020 (JP) .............................. JP2020-155379

(51) Int. Cl.
| | |
|---|---|
| G03B 21/20 | (2006.01) |
| G02F 1/1335 | (2006.01) |
| G03B 33/12 | (2006.01) |
| G02B 27/28 | (2006.01) |
| G02B 5/30 | (2006.01) |
| H04N 9/31 | (2006.01) |
| G02B 27/14 | (2006.01) |

(52) U.S. Cl.
CPC ..... *H04N 9/3167* (2013.01); *G02F 1/133526* (2013.01); *G03B 21/2073* (2013.01); *H04N 9/3152* (2013.01)

(58) Field of Classification Search
CPC ............ H04N 9/33167; G03B 21/2073; G02F 1/133526
USPC .......................................................... 353/20
See application file for complete search history.

(56) References Cited

U.S. PATENT DOCUMENTS

| | | | |
|---|---|---|---|
| 5,161,042 A | 11/1992 | Hamada | |
| 10,444,611 B2 * | 10/2019 | Pan | ...................... G03B 21/204 |
| 10,915,014 B1 | 2/2021 | Akiyama | |
| 2005/0248736 A1 | 11/2005 | Itoh | |
| 2008/0062386 A1 | 3/2008 | Ito | |
| 2013/0027670 A1 | 1/2013 | Akiyama et al. | |
| 2013/0242264 A1 | 9/2013 | Saitou | |

(Continued)

FOREIGN PATENT DOCUMENTS

| | | |
|---|---|---|
| JP | H04-60538 A | 2/1992 |
| JP | 2005-321502 A | 11/2005 |

(Continued)

*Primary Examiner* — Jerry L Brooks
(74) *Attorney, Agent, or Firm* — Oliff PLC

(57) ABSTRACT

A light source apparatus includes a light source section that outputs first light, a first polarization separator that separates the first light in terms of polarization, a second polarization separator that reflects in the second direction a portion of the first light polarized in the first polarization direction and transmits the other portion of the first light polarized in the first polarization direction, a diffusion element that diffuses the first light incident from the first polarization separator, a first wavelength converter that converts in terms of wavelength the portion of the first light incident from the second polarization separator and emits second light, and a second wavelength converter that converts in terms of wavelength the other portion of the first light incident from the second polarization separator and emits third light.

13 Claims, 10 Drawing Sheets

(56) References Cited

U.S. PATENT DOCUMENTS

| | | |
|---|---|---|
| 2013/0242268 A1 | 9/2013 | Saitou |
| 2020/0201155 A1 | 6/2020 | Akiyama |
| 2020/0249555 A1 | 8/2020 | Akiyama |
| 2020/0252589 A1 | 8/2020 | Akiyama |
| 2020/0314397 A1 | 10/2020 | Akiyama |

FOREIGN PATENT DOCUMENTS

| | | |
|---|---|---|
| JP | 2008-065250 A | 3/2008 |
| JP | 2013-111176 A | 6/2013 |
| JP | 2013-167812 A | 8/2013 |
| JP | 2014-106453 A | 6/2014 |
| JP | 2014-182206 A | 9/2014 |
| JP | 2015-060035 A | 3/2015 |
| JP | 2019-053241 A | 4/2019 |
| JP | 2020-034821 A | 3/2020 |
| JP | 2020-101711 A | 7/2020 |
| JP | 2020-106692 A | 7/2020 |
| JP | 2020-126089 A | 8/2020 |
| JP | 2020-126170 A | 8/2020 |
| JP | 2020-160236 A | 10/2020 |
| JP | 2021-033165 A | 3/2021 |
| WO | 2012/077191 A1 | 6/2012 |
| WO | 2012/077192 A1 | 6/2012 |

\* cited by examiner

LIGHT SOURCE APPARATUS AND PROJECTOR

The present application is based on, and claims priority from JP Application Serial Number 2020-155379, filed Sep. 16, 2020, the disclosure of which is hereby incorporated by reference herein in its entirety.

BACKGROUND

1. Technical Field

The present disclosure relates to a light source apparatus and a projector.

2. Related Art

There is a known projector that modulates the light outputted from a light source to generate image light based on image information and projects the generated image light. JP-A-4-60538 discloses a projection-type color image display apparatus including a light source, a plurality of dichroic mirrors, a liquid crystal display device including a microlens array, and a projection lens. The projection-type color image display apparatus separates white light outputted from the light source into a plurality of color luminous fluxes different in color from one another and performs color display operation by causing the plurality of separated color luminous fluxes to be incident on different sub-pixels in the single liquid crystal display device.

In the projection-type color image display apparatus described above, a red light reflecting dichroic mirror, a green light reflecting dichroic mirror, and a blue light reflecting dichroic mirror are arranged so as to be nonparallel to one another along the optical axis along which the white light outputted from the light source is incident. The white light outputted from the light source passes through the dichroic mirrors described above, which separate the white light into red light, green light, and blue light that travel in directions different from one another. The red light, the green light, and the blue light are incident on red sub-pixels, green sub-pixels, and blue sub-pixels of a light modulation device, respectively, with the red light, the green light, and the blue light spatially separated from one another by the microlenses provided on the light incident side of the light modulation device.

In the projection-type color image display apparatus disclosed in JP-A-4-60538, a lamp light source, such as a halogen lamp or a xenon lamp, is used as the white light source, and the liquid crystal display device is used as the light modulation device. The light outputted from the lamp light source is unpolarized light, and when the liquid crystal display device is used as the light modulation device, the light incident on the liquid crystal display device needs to be linearly polarized light polarized in a specific direction. On the other hand, to uniformly illuminate the liquid crystal display device, it is conceivable to provide, between the white light source and the liquid crystal display device, a pair of multi-lens arrays that divide the light incident thereon into a plurality of sub-luminous fluxes and a polarization converter that aligns the polarization directions of the plurality of sub-luminous fluxes with one another. In this case, a polarization converter including the following sections is used in many cases: a plurality of polarization separation layers and a plurality of reflection layers alternately arranged along the direction intersecting the light incident direction and a retardation layer provided in the optical path of the light having passed through the polarization separation layers or the optical path of the light reflected off the reflection layers.

However, when the size of the projection-type color image display apparatus described above is reduced to meet the recent demand for size reduction, it is difficult to manufacture a polarization converter formed of the polarization separation layers and the reflection layers arranged at small intervals. It is therefore difficult to reduce the size of a light source apparatus including a polarization converter of this type and in turn the size of a projector including the light source apparatus. In view of the problems described above, there is a need to provide a light source apparatus capable of outputting a plurality of color luminous fluxes polarized in an aligned direction without use of a small-interval polarization converter.

SUMMARY

To solve the problems described above, according to an aspect of the present disclosure, there is provided a light source apparatus including a light source section that outputs first light having a first wavelength band and containing light polarized in a first polarization direction and light polarized in a second polarization direction different from the first polarization direction, a first polarization separator that transmits in a first direction the first light polarized in the first polarization direction and incident from the light source section along the first direction and reflects in a second direction intersecting the first direction the first light polarized in the second polarization direction and incident from the light source section along the first direction, a second polarization separator that is disposed in a position shifted in the first direction from the first polarization separator, reflects in the second direction a portion of the first light polarized in the first polarization direction and incident from the first polarization separator along the first direction, and transmits in the first direction another portion of the first light polarized in the first polarization direction and incident from the first optical member along the first direction, a diffusion element that is disposed in a position shifted in the second direction from the first polarization separator, diffuses the first light incident from the first polarization separator along the second direction, and emits the diffused first light in a third direction opposite the second direction, a first wavelength converter that is disposed in a position shifted in the second direction from the second polarization separator, converts in terms of wavelength the portion of the first light incident from the second polarization separator along the second direction, and emits second light having a second wavelength band different from the first wavelength band in the third direction, and a second wavelength converter that is disposed in a position shifted in the first direction from the second polarization separator, converts in terms of wavelength the other portion of the first light incident from the second polarization separator along the first direction, and emits third light having a third wavelength band different from the first and second wavelength bands in a fourth direction opposite the first direction. The second polarization separator receives the second light from the first wavelength converter along the third direction, transmits in the third direction the second light polarized in the first polarization direction, and reflects in the fourth direction the second light polarized in the second polarization direction. The second polarization separator receives at least the third light polarized in the second polarization direction from the second wavelength converter along the fourth direction and reflects in the third direction the third light polarized in the second polarization direction. The first polarization separator transmits the first light emitted from the diffusion element along the third direction and reflects in the third direction the second light polarized in the second polarization direction and incident from the second polarization separator along the fourth direction.

According to another aspect of the present disclosure, there is provided a projector including the light source apparatus according to the aspect of the present disclosure, a light modulator that modulates light from the light source apparatus in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to FIGS. 1 to 10.

Figure 1:
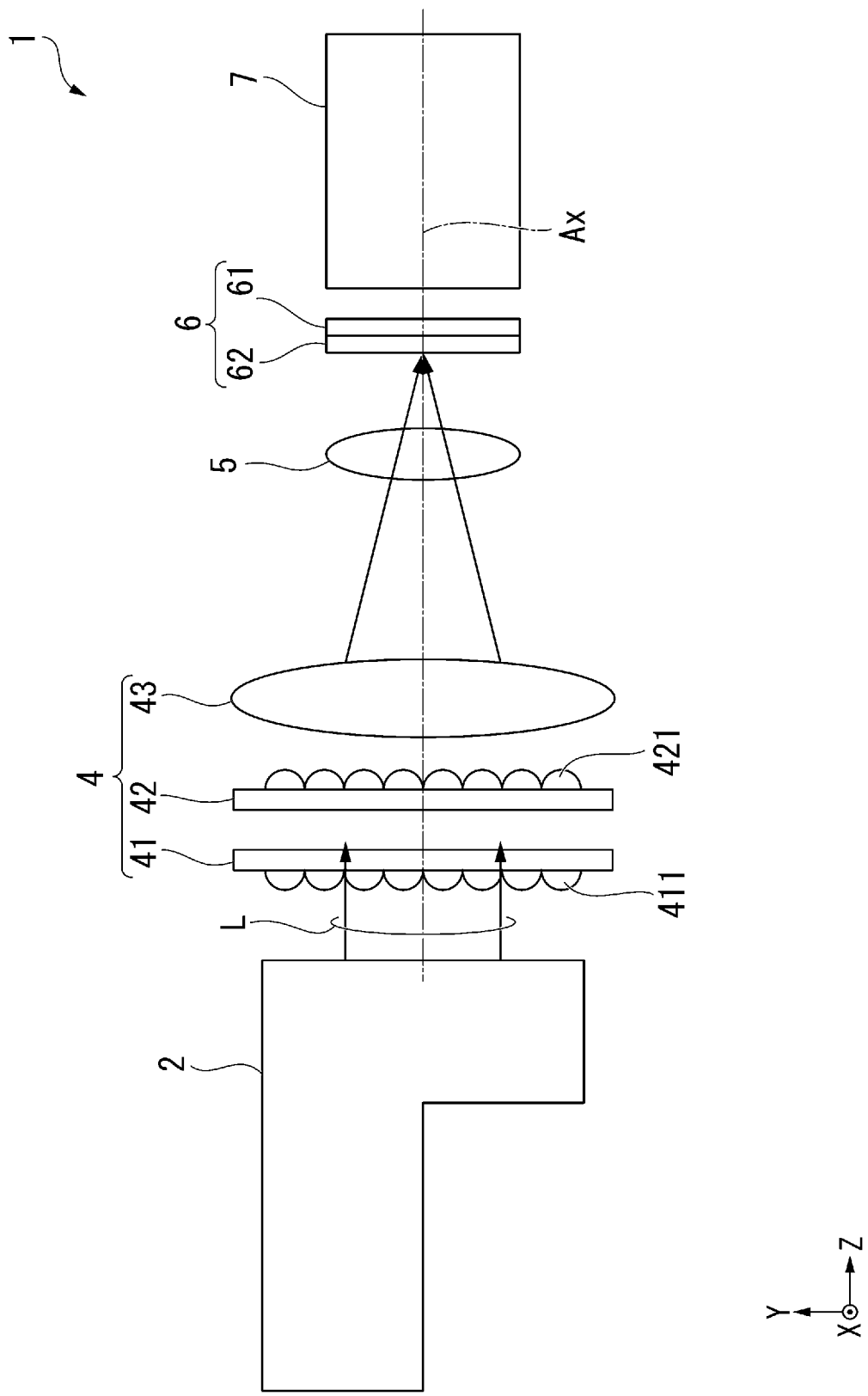
FIG. 1 is a schematic configuration diagram of a projector according to a first embodiment.

FIG. 1 is a schematic configuration diagram of a projector 1 according to the present embodiment.

In the following drawings, components are drawn at different dimensional scales in some cases for clarification of each of the components.

The projector 1 according to the present embodiment modulates light outputted from a light source apparatus 2 to form an image according to image information and enlarges and projects the formed image on a projection receiving surface, such as a screen. In other words, the projector 1 modulates the light outputted from the light source apparatus 2 by using a single light modulator 6 including a single liquid crystal panel 61 to form an image and projects the formed image. The projector 1 is what is called a single-panel projector.

The projector 1 includes the light source apparatus 2, a homogenizer 4, a field lens 5, the light modulator 6, and a projection optical apparatus 7, as shown in FIG. 1. The light source apparatus 2, the homogenizer 4, the field lens 5, the light modulator 6, and the projection optical apparatus 7 are disposed in predetermined positions along an illumination optical axis Ax. The illumination optical axis Ax is defined as an axis extending along the traveling direction of the chief ray of light L outputted from the light source apparatus 2.

The configurations of the light source apparatus 2 and the homogenizer 4 will be described later in detail.

The field lens 5 is disposed between the homogenizer 4 and the light modulator 6. The field lens 5 parallelizes the light L having exited out of the homogenizer 4 and guides the parallelized light L to the light modulator 6.

The projection optical apparatus 7 projects the light modulated by the light modulator 6, that is, image forming light onto the projection receiving surface (not shown), such as a screen. The projection optical apparatus 7 includes a single projection lens or a plurality of projection lenses.

In the following description, an axis parallel to the traveling direction of the light outputted from the light source apparatus 2 along the illumination optical axis Ax is called an axis Z, and the light traveling direction is called a direction +Z. Two axes that are perpendicular to the axis Z and to each other are called an axis X and an axis Y. Out of the directions along the axes X, Y, and Z, the direction toward the upper side of the vertical direction in the space where the projector 1 is installed is called a direction +Y. The direction toward the right side of the horizontal direction is called a direction +X when a target object on which light is incident along the direction +Z is so viewed that the direction +Y is oriented toward the upper side of the vertical direction. Although not shown, the direction opposite the direction +X is a direction −X, the direction opposite the direction +Y is a direction −Y, and the direction opposite the direction +Z is a direction −Z.

The direction +X in the present embodiment corresponds to the first direction in the appended claims, and the direction −Z in the present embodiment corresponds to the second direction in the appended claims. The direction +Z in the present embodiment corresponds to the third direction in the appended claims, and the direction −X in the present embodiment corresponds to the fourth direction in the appended claims.

Configuration of Light Source Apparatus

Figure 2:
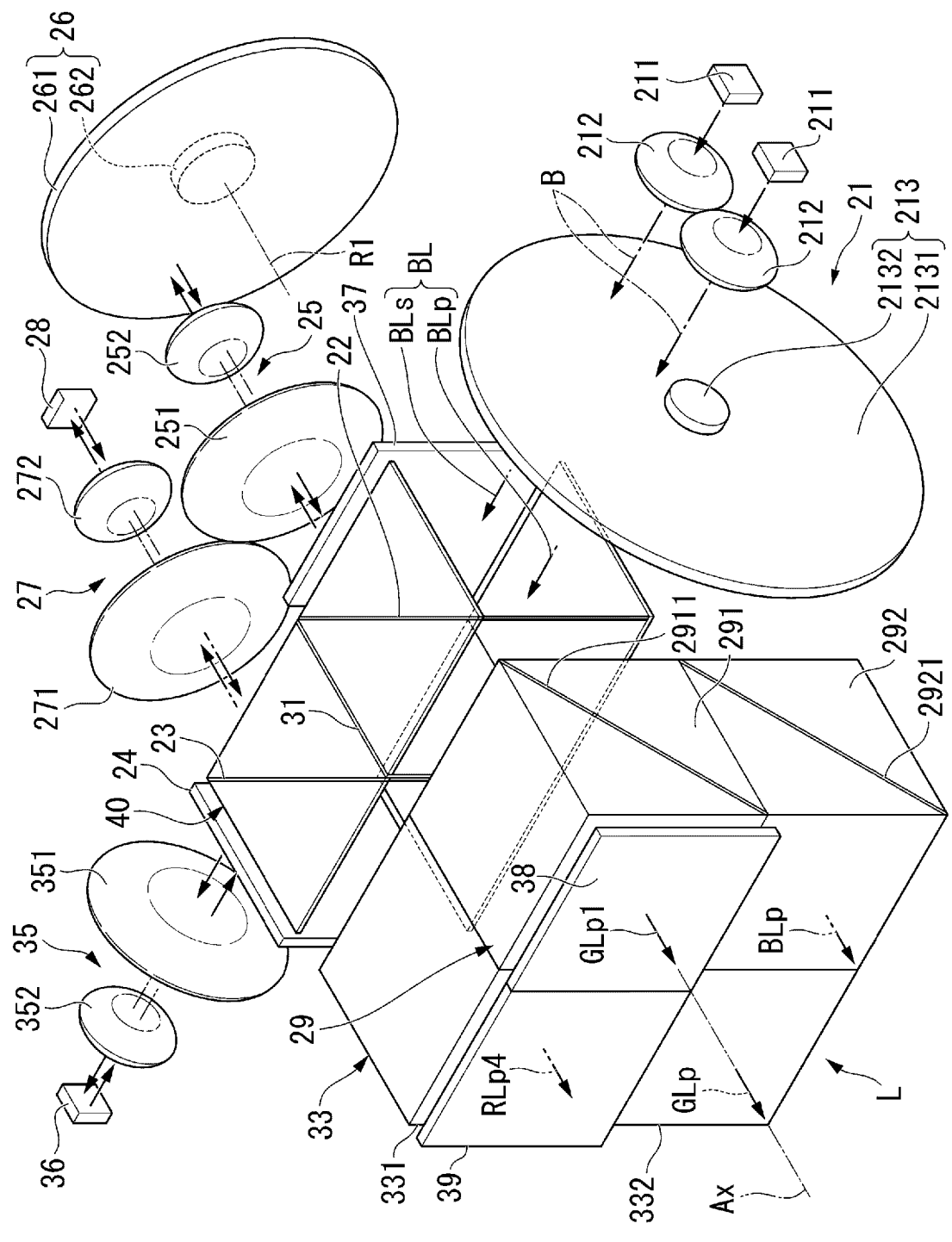
FIG. 2 is a perspective view of a light source apparatus according to the first embodiment.
Figure 3:
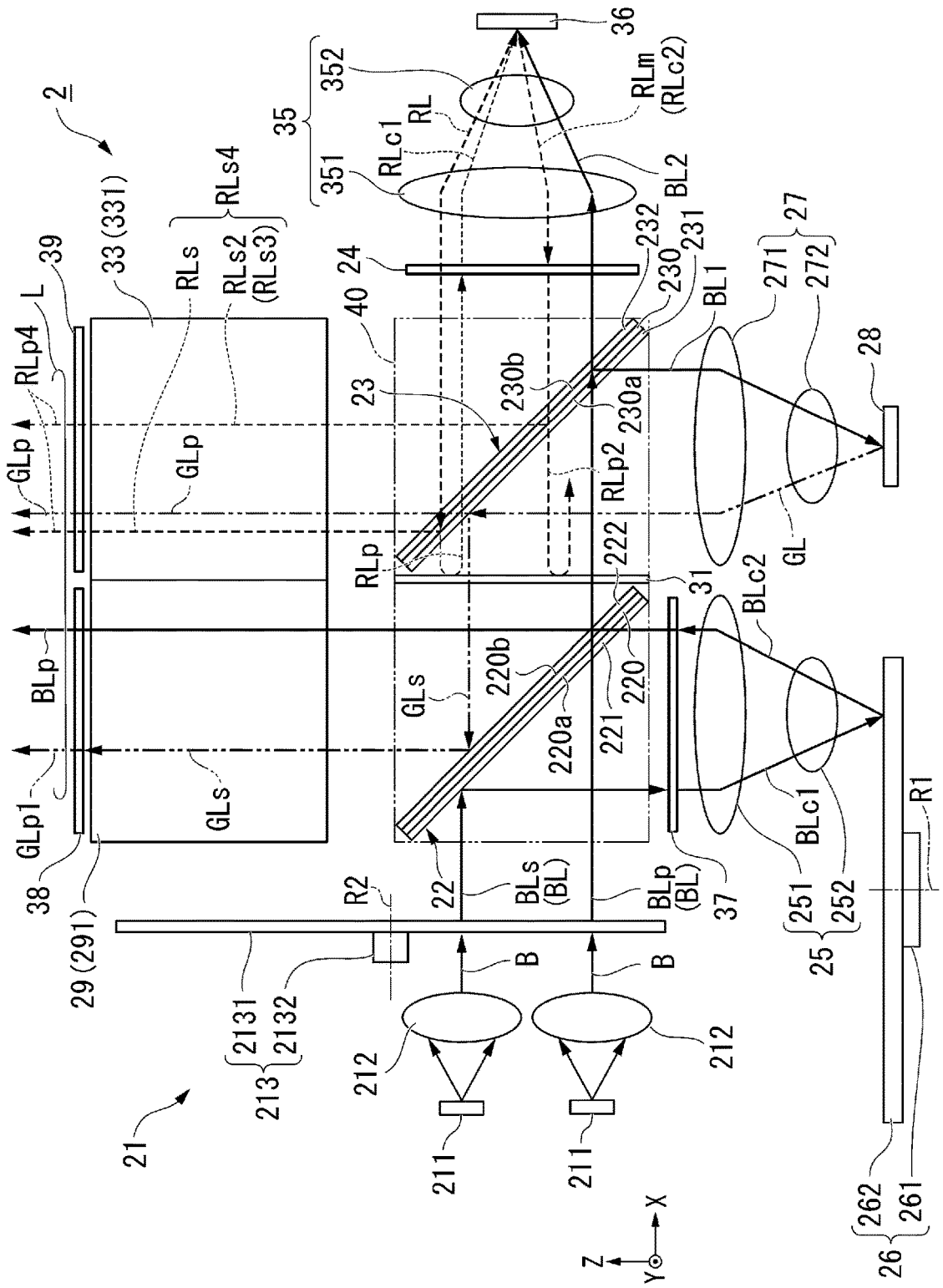
FIG. 3 is a plan view of the light source apparatus viewed in a direction +Y.

FIG. 2 is a perspective view of the light source apparatus 2 according to the present embodiment. FIG. 3 is a plan view of the light source apparatus 2 viewed in the direction +Y.

The light source apparatus 2 outputs the light L, which illuminates the light modulator 6, in the direction parallel to the illumination optical axis Ax, that is, in the direction +Z, as shown in FIGS. 2 and 3. The light L outputted by the light source apparatus 2 is linearly polarized light having an aligned polarization direction and contains a plurality of spatially separated color luminous fluxes. In the present embodiment, the light L outputted by the light source apparatus 2 is formed of four luminous fluxes each formed of P-polarized light. The four luminous fluxes are green light GLp1, blue light BLp, red light RLp4, and green light GLp.

The light source apparatus 2 includes a light source section 21, a first optical member 22, a second optical member 23, a first light collector 25, a diffuser 26, a second light collector 27, a first wavelength converter 28, a first retardation element 24, a third light collector 35, a second wavelength converter 36, a first color separator 29, a second color separator 33, an optical element 31, a second retardation element 37, a fourth retardation element 38, a fifth retardation element 39, and a light tunnel 40.

A P-polarized component in the present embodiment corresponds to the light polarized in a first polarization direction in the appended claims, and an S-polarized component corresponds to the light polarized in a second polarization direction in the appended claims. As will be described later, the first optical member 22 and the second optical member 23 differ from the first color separator 29 and the second color separator 33 in terms of the orientation of a polarized component separation film or a color luminous flux separation film. The notation of the P-polarized component and the S-polarized component is therefore expressed in terms of polarization direction with respect to the first optical member 22 and the second optical member 23, and the notation is reversed for the first color separator 29 and the second color separator 33. That is, the P polarized component with respect to the first optical member 22 and the second optical member 23 is the S polarized component with respect to the first color separator 29 and the second color separator 33, and the S polarized component with respect to the first optical member 22 and the second optical member 23 is the P polarized component with respect to the first color separator 29 and the second color separator 33. It is, however, noted that the P-polarized component and the S-polarized component are hereinafter used as the polarization directions with respect to the first optical member 22 and the second optical member 23 so as not to cause confusion in the description.

Configuration of Light Source Section

The light source section 21 outputs blue light BLs to be incident on the first optical member 22 along the direction +X. The light source section 21 includes a plurality of light emitters 211, a plurality of collimator lenses 212, and a rotary retarder 213. The light emitters 211 are each formed of a solid-state light source that outputs a blue beam B. Specifically, the light emitters 211 are each formed of a semiconductor laser that outputs an S-polarized blue beam B. The blue beam B is laser light having a blue wavelength band ranging, for example, from 440 to 480 nm and a peak wavelength that falls within the range, for example, from 450 to 460 nm. That is, the light emitters 211 each output the blue beam B having the blue wavelength band. In the present embodiment, the blue beam B having the blue wavelength band corresponds to the light having the first wavelength band in the appended claims.

In the present embodiment, the plurality of light emitters 211 are arranged along the axis Z.

The light source section 21 in the present embodiment includes two light emitters 211, but the number of light emitters 211 is not limited to a specific number and may be one. Furthermore, the arrangement of the plurality of light emitters 211 is also not limited to a specific arrangement. The light emitters 211 are disposed so as to output the S-polarized blue beams B but may instead be disposed so as to output P-polarized blue light because the rotary retarder 213 can arbitrarily set the ratio between the amount of S-polarized light and the amount of P-polarized light. That is, the light emitters 211 may each be rotated by 90° around the light exiting optical axis of the light emitter 211.

The plurality of collimator lenses 212 are provided between the plurality of light emitters 211 and the rotary retarder 213. The collimator lenses 212 are provided in correspondence with the respective light emitters 211. The collimator lenses 212 parallelize the light outputted from the respective light emitters 211.

The rotary retarder 213 includes a third retardation element 2131 and a rotator 2132. The third retardation element 2131 is rotatable around an axis of rotation along the traveling direction of the light incident on the third retardation element 2131, that is, an axis of rotation R2 parallel to the axis X. The rotator 2132 is formed, for example, of a motor and rotates the third retardation element 2131.

The third retardation element 2131 is formed of a half-wave plate or a quarter-wave plate for the blue wavelength band. Part of the S-polarized blue beams B incident on the third retardation element 2131 is converted by the third retardation element 2131 into P-polarized blue light BLp. The blue beams B having passed through the third retardation element 2131 are each therefore the mixture of the S-polarized blue light BLs and the P-polarized blue light BLp mixed at a predetermined ratio. That is, the third retardation element 2131 receives the blue beams B outputted from the light emitters 211 and outputs blue light containing the S-polarized blue light BLs and the P-polarized blue light BLp.

The rotator 2132 adjusts the angle of rotation of the third retardation element 2131 to adjust the ratio between the amount of S-polarized blue light BLs and the amount of P-polarized blue light BLp contained in the light that passes through the third retardation element 2131. When there is no need to adjust the ratio between the amount of blue light BLs and the amount of blue light BLp, the rotator 2132, which rotates the third retardation element 2131, may not be provided. In this case, the angle of rotation of the third retardation element 2131 is so set that the ratio between the amount of blue light BLs and the amount of blue light BLp is a ratio set in advance, and the rotational position of the third retardation element 2131 is then fixed.

The light source section 21 in the present embodiment thus outputs first light BL, which has the blue wavelength band and contains the S-polarized blue light BLs and the P-polarized blue light BLp. In the present embodiment, the first light BL having the blue wavelength band corresponds to the first light having a first wavelength band in the appended claims. The P-polarized blue light BLp corresponds to the light polarized in a first polarization direction in the appended claims, and the S-polarized blue light BLs corresponds to the light polarized in a second polarization direction in the appended claims.

In the present embodiment, the plurality of light emitters 211 are all configured to output the S-polarized blue light BLs, and the light source section 21 may be a mixture of light emitters 211 that output the S-polarized blue light BLs and light emitters 211 that output the P-polarized blue light BLp. According to the configuration described above, the rotary retarder 213 can be omitted. The light emitters 211 are each not necessarily formed of a semiconductor laser and may instead each be formed of any other solid-state light source, such as an LED (light emitting diode).

Configuration of First Optical Member

The first light BL containing the S-polarized blue light BLs and the P-polarized blue light BLp is incident on the first optical member 22 along the direction +X. The first optical member 22 is formed of a plate-shaped polarization separator. The first optical member 22 includes a first transparent substrate 220, a first optical layer 221, and a second optical layer 222. The first transparent substrate 220 has a first surface 220a and a second surface 220b, which face away from each other. The first transparent substrate 220 is formed, for example, of a typical optical glass plate. The first optical member 22 in the present embodiment corresponds to the first polarization separator in the appended claims.

The first transparent substrate 220 is disposed so as to incline by 45° with respect to the axes X and Z. In other words, the first transparent substrate 220 inclines by 45° with respect to the planes XY and YZ.

The first transparent substrate 220 is so disposed that the first surface 220a faces the light source section 21. The first optical layer 221 is formed at the first surface 220a of the first transparent substrate 220. Therefore, the first optical layer 221 is disposed so as to face the light source section 21 and inclines by 45° with respect to the planes XY and YZ.

The first optical layer 221 has a polarization separation characteristic that causes the first optical layer 221 to transmit the P-polarized light and reflect the S-polarized light out of light having the blue wavelength band. The first optical member 22 therefore transmits the P-polarized blue light BLp along the direction +X and reflects the S-polarized blue light BLs in the direction −Z out of the blue first light BL incident on the first optical layer 221 along the direction +X. The first optical layer 221 is formed, for example, of a dielectric multilayer film.

The second optical layer 222 is formed at the second surface 220b of the first transparent substrate 220. That is, the second optical layer 222 is disposed in a position shifted in the direction +X from the first optical layer 221. The second optical layer 222 is optically characterized in that it transmits the P-polarized component of light having the blue wavelength band. The second optical layer 222 is further optically characterized in that it reflects at least the S-polarized component of light having a green wavelength band formed of wavelengths longer than those in the blue wavelength band. In the present embodiment, the second optical layer 222 is formed, for example, of a dichroic mirror. The second optical layer 222 may instead be a dielectric multi-layer film having a polarization separation characteristic that causes the second optical layer 222 to transmit the P-polarized component and reflect the S-polarized component of light having the blue wavelength band and the green wavelength band.

Since the first optical member 22 in the present embodiment is a plate-shaped polarization separator, the function of the first optical layer 221 formed at the first surface 220a of the first transparent substrate 220 and the function of the second optical layer 222 formed at the second surface 220b of the first transparent substrate 220 can be designed separately. The first optical layer 221 and the second optical layer 222 are therefore relatively readily designed as films.

The P-polarized blue light BLp having passed through the first optical layer 221 passes through the first transparent substrate 220 and is incident on the second optical layer 222. The second optical layer 222 transmits in the direction +X the P-polarized blue light BLp incident from the first optical layer 221 along the direction +X.

The first optical member 22 having the configuration described above can separate the first light BL outputted from the light source section 21 into the P-polarized blue light BLp and the S-polarized blue light BLs, transmit the P-polarized blue light BLp in the direction +X to cause the transmitted P-polarized blue light BLp to be incident on the second optical member 23, and reflect the S-polarized blue light BLs in the direction Z to cause the reflected S-polarized blue light BLs to be incident on the diffuser 26.

Configuration of Second Optical Member

The second optical member 23 is disposed in a position shifted in the direction +X from the first optical member 22. That is, the second optical member 23 is disposed in a position shifted in the direction +X from the second optical layer 222 of the first optical member 22. The P-polarized blue light BLp having passed through the first optical member 22 is incident on the second optical member 23. The second optical member 23 is formed of a plate-shaped polarization separator, as the first optical member 22 is. The second optical member 23 in the present embodiment corresponds to the second polarization separator in the appended claims.

The second optical member 23 includes a second transparent substrate 230, a third optical layer 231, and a fourth optical layer 232. The second transparent substrate 230 has a third surface 230a and a fourth surface 230b, which face away from each other. The second transparent substrate 230 is formed, for example, of a typical optical glass plate.

The second transparent substrate 230 is disposed so as to incline by 45° with respect to the axes X and Z. In other words, the second transparent substrate 230 inclines by 45° with respect to the planes XY and YZ.

The second transparent substrate 230 is so disposed that the third surface 230a faces the first optical member 22. That is, the third surface 230a of the second transparent substrate 230 and the second surface 220b of the first transparent substrate 220 face each other. The third optical layer 231 is formed at the third surface 230a of the second transparent substrate 230. Therefore, the third optical layer 231 is disposed so as to face the second optical layer 222 and inclines by 45° with respect to the planes XY and YZ.

The third optical layer 231 is characterized in that it transmits the P-polarized component of the light having the blue wavelength band. The third optical layer 231 therefore transmits in the direction +X the P-polarized blue light BLp incident along the direction +X. The third optical layer 231 is further optically characterized in that it transmits light formed of the P-polarized component and reflects light formed of the S-polarized component out of light having the green wavelength band and a red wavelength band. The third optical layer 231 is formed, for example, of a dielectric multilayer film.

The fourth optical layer 232 is formed at the fourth surface 230b of the second transparent substrate 230. The fourth optical layer 232 is therefore disposed in a position shifted in the direction +X from the third optical layer 231. The fourth optical layer 232 in the present embodiment functions as a half-silvered mirror for light having the blue wavelength band. Functioning as a half-silvered mirror for light having the blue wavelength band is not limited to a case where the proportion of the transmitted P-polarized light is equal to the proportion of the reflected P-polarized light and means that the half-silvered mirror is characterized in that it transmits part of the P-polarized light and reflects the other part thereof. That is, the fourth optical layer 232 adjusts as appropriate the proportion of the reflected P-polarized component and the proportion of the transmitted P-polarized component in accordance with the color balance of the light outputted from the light source apparatus 2.

In general, an optical film readily reflects the S-polarized light and transmits the P-polarized light, and it is very difficult to design an optical film that reflects 100% of the P-polarized light, resulting in a problem of a very high cost of a thus designed optical film.

In the light source apparatus 2 according to the present embodiment, a film having the half-silvered mirror function is used as the fourth optical layer 232 to separate the P-polarized blue light BLp into excitation light BL1 for exciting the first wavelength converter 28 and excitation light BL2 for exciting the second wavelength converter 36, as will be described later. The fourth optical layer 232 therefore does not need to be designed described above, that is, designed to reflect 100% of the P-polarized light.

Furthermore, the fourth optical layer 232 is optically characterized in that it transmits at least P-polarized light out of light having the green wavelength band. The fourth optical layer 232 is further optically characterized in that it transmits light having the red wavelength band irrespective of the polarization direction of the light. The fourth optical layer 232 is formed, for example, of a dielectric multilayer film.

The second optical member 23 having the configuration described above can reflect in the direction −Z a portion of the P-polarized blue light BLp incident from the first optical member 22 along the direction +X and transmit in the direction +X the other portion of the P-polarized blue light BLp incident from the first optical member 22 along the direction +X. The portion of the blue light BLp that exits out of the second optical member 23 in the direction −Z is incident as the excitation light BL1 on the first wavelength converter 28, and the other portion of the blue light BLp that exits out of the second optical member 23 in the direction +X is incident as the excitation light BL2 on the second wavelength converter 36.

The excitation light BL1 in the present embodiment corresponds to the portion of the first light in the appended claims, and the excitation light BL2 in the present embodiment corresponds to the other part of the first light in the appended claims.

Since the second optical member 23 in the present embodiment is a plate-shaped polarization separator, the function of the third optical layer 231 formed at the third surface 230a of the second transparent substrate 230 and the function of the fourth optical layer 232 formed at the fourth surface 230b of the second transparent substrate 230 can be designed separately. The third optical layer 231 and the fourth optical layer 232 are therefore relatively readily designed as films.

Configuration of Second Retardation Element

The second retardation element 37 is disposed in a position shifted in the direction −Z from the first optical member 22. That is, the second retardation element 37 is disposed on the axis Z between the first optical member 22 and the diffuser 26. The S-polarized blue light BLs reflected in the direction −Z off the first optical layer 221 of the first optical member 22 is incident on the second retardation element 37. The second retardation element 37 is formed of a quarter-wave plate for the blue wavelength band of the blue light BLs incident on the second retardation element 37. The S-polarized blue light BLs reflected off the first optical member 22 is converted by the second retardation element 37 into, for example, right-handed circularly polarized blue light BLc1, which then exits toward the first light collector 25. That is, the second retardation element 37 converts the polarization state of the blue light BLs incident thereon.

Configuration of First Light Collector

The first light collector 25 is disposed in a position shifted in the direction −Z from the second retardation element 37. That is, the first light collector 25 is disposed on the axis Z between the second retardation element 37 and the diffuser 26. The first light collector 25 focuses the blue light BLc1 incident from the second retardation element 37 onto a diffuser plate 261 of the diffuser 26. Furthermore, the first light collector 25 parallelizes blue light BLc2 to be described later, which is incident from the diffuser 261. In the example shown in FIG. 3, the first light collector 25 is formed of a first lens 251 and a second lens 252, but the number of lenses that form the first light collector 25 is not limited to a specific number.

Configuration of Diffuser

The diffuser 26 is disposed in a position shifted in the direction −Z from the first light collector 25. That is, the diffuser 26 is disposed in a position shifted in the direction −Z from the first optical member 22. The diffuser 26 reflects in the direction +Z the blue light BLc1 incident from the first light collector 25 in the direction −Z while diffusing the blue light BLc1 at angles of diffusion comparable to those of green light GL emitted from the wavelength converter 28, which will be described later, or those of red light RL emitted from the second wavelength converter 36, which will be described later. The diffuser 26 includes the diffuser plate 261 and a rotator 262. The diffuser plate 261 preferably has a reflection characteristic that achieves closest possible Lambertian scattering and reflects the blue light BLc1 incident on the diffuser plate 261 at wide angles. The rotator 262 is formed, for example, of a motor and rotates the diffuser plate 261 around an axis of rotation R1 parallel to the direction +Z.

The diffuser plate 261 in the present embodiment corresponds to the diffusion element in the appended claims.

The blue light BLc1 incident on the diffuser plate 261 is reflected off the diffuser plate 261 and converted into the blue light BLc2, which is circularly polarized light having a polarization rotation direction opposite the polarization rotation direction of the blue light BLc1 before the conversion. That is, the right-handed circularly polarized blue light BLc1 is converted by the diffuser plate 261 into left-handed circularly polarized blue light BLc2. The blue light BLc2 emitted from the diffuser 26 passes through the first light collector 25 in the direction +Z and is then incident on the second retardation element 37 again. In this process, the blue light BLc2 incident from the first light collector 25 on the second retardation element 37 is converted by the second retardation element 37 into the P-polarized blue light BLp. The converted blue light BLp is incident on the first optical member 22. In this process, the first optical layer 221 transmits in the direction +Z the blue light BLp emitted from the diffuser plate 261 along the direction +Z and incident on the first optical layer 221. The second optical layer 222 transmits in the direction +Z the blue light BLp having exited out of the first optical layer 221 along the direction +Z, having passed through the first transparent substrate 220, and having been incident on the second optical layer 222. The converted blue light BLp thus exits out of the first optical member 22 in the direction +Z.

Configuration of Second Light Collector

The second light collector 27 is disposed in a position shifted in the direction −Z from the second optical member 23. That is, the second light collector 27 is disposed on the axis Z between the second optical member 23 and the first wavelength converter 28. The second light collector 27 focuses the excitation light BL1, which is a portion of the blue light BLp reflected off the second optical member 23, onto the first wavelength converter 28. Furthermore, the second light collector 27 parallelizes the green light GL to be described later, which is emitted from the first wavelength converter 28, and directs the parallelized green light GL toward the second optical member 23. In the example shown in FIG. 3, the second light collector 27 is formed of a first lens 271 and a second lens 272, but the number of lenses that form the second light collector 27 is not limited to a specific number.

Configuration of First Wavelength Converter

The first wavelength converter 28 is disposed in a position shifted in the direction −Z from the second light collector 27. That is, the first wavelength converter 28 is disposed in a position shifted in the direction −Z from the second optical member 23. The first wavelength converter 28 is a reflective wavelength converter that is excited by light incident thereon and emits light having a wavelength different from the wavelength of the incident light in a direction opposite the direction of the incident light. In other words, the first wavelength converter 28 converts the light incident thereon in terms of wavelength and emits the light having the converted wavelength in the direction opposite the direction of the incident light.

The first wavelength converter 28 in the present embodiment contains a green phosphor that is excited by the excitation light BL1 and emits green light. Specifically, the first wavelength converter 28 contains a phosphor material, for example, an $Lu_3Al_5O_{12}$: $Ce^{3+}$-based phosphor, a $Y_3O_4$: $Eu^{2+}$-based phosphor, a $(Ba, Sr)_2SiO_4$: $Eu^{2+}$-based phosphor, a $Ba_3Si_6O_{12}N_2$: $Eu^{2+}$-based phosphor, an $(Si, Al)_6(O, N)_8$: $Eu^{2+}$-based phosphor.

The first wavelength converter 28 emits in the direction +Z the green light GL, which is fluorescence having the green wavelength band formed of wavelengths longer than those in the blue wavelength band of the excitation light BL1 incident from the second optical member 23 along the direction −Z. The green light GL is unpolarized green light that is the mixture of the S-polarized component and the P-polarized component and has a wavelength band ranging, for example, from 500 to 570 nm.

The fluorescence having the green wavelength band in the present embodiment, that is, the unpolarized green light GL corresponds to the second light having a second wavelength band in the appended claims.

The green light GL emitted from the first wavelength converter 28 passes along the direction +Z through the second light collector 27, which substantially parallelizes the green light GL, and the parallelized green light GL is then incident on the second optical member 23. The first wavelength converter 28 in the present embodiment is a fixed wavelength converter and may be replaced with a rotary wavelength converter including a rotator that rotates the first wavelength converter 28 around an axis of rotation parallel to the axis Z. In this case, an increase in the temperature of the first wavelength converter 28 can be suppressed, whereby the wavelength conversion efficiency can be increased.

The third optical layer 231 of the second optical member 23 has the polarization separation characteristic that causes the third optical layer 231 to reflect S-polarized light and transmit P-polarized light out of light having the green wavelength band, as described above. Therefore, out of the unpolarized green light GL incident on the third optical layer 231, S-polarized green light GLs is reflected off the third optical layer 231 in the direction −X, passes through the optical element 31, and is incident on the second optical layer 222 of the first optical member 22. The optical element 31 does not affect the polarization state of the green light GLs. The configuration of the optical element 31 will be described later.

The second optical layer 222 of the first optical member 22 reflects at least the S-polarized component of light having the green wavelength band, as described above. The second optical layer 222 therefore reflects in the direction +Z the S-polarized green light GLs incident along the direction −X.

The first optical member 22 can therefore direct in the direction +Z the S-polarized green light GLs out of the green light GL emitted from the first wavelength converter 28.

On the other hand, out of the unpolarized green light GL incident on the third optical layer 231, P-polarized green light GLp passes through the third optical layer 231 in the direction +Z and is incident on the fourth optical layer 232. The fourth optical layer 232 transmits at least the P-polarized component of light having the green wavelength band, as described above. The fourth optical layer 232 therefore transmits in the direction +Z the P-polarized green light GLp incident from the third optical layer 231 along the direction +Z.

The second optical member 23 can therefore direct the P-polarized green light GLp in the direction +Z.

In the present embodiment, the P-polarized green light GLp corresponds to the second light polarized in the first polarization direction in the appended claims, and the S-polarized green light GLs corresponds to the second light polarized in the second polarization direction in the appended claims.

Configuration of Third Light Collector

The third light collector 35 is disposed in a position shifted in the direction +X from the second optical member 23. That is, the third light collector 35 is disposed on the axis X between the second optical member 23 and the second wavelength converter 36. The third light collector 35 focuses the excitation light BL2, which is the other portion of the blue light BLp having passed through the second optical member 23, onto the second wavelength converter 36. Furthermore, the third light collector 35 parallelizes the red light RL to be described later, which is incident from the second wavelength converter 36. In the example shown in FIG. 3, the third light collector 35 is formed of a first lens 351 and a second lens 352, but the number of lenses that form the third light collector 35 is not limited to a specific number.

Configuration of Second Wavelength Converter

The second wavelength converter 36 is disposed in a position shifted in the direction +X from the third light collector 35. That is, the second wavelength converter 36 is disposed in a position shifted in the direction +X from the second optical member 23. The second wavelength converter 36 is a reflective wavelength converter that is excited by light incident thereon and emits light having a wavelength different from the wavelength of the incident light in a direction opposite the direction of the incident light. In other words, the second wavelength converter 36 converts the light incident thereon in terms of wavelength and emits the light having the converted wavelength in the direction opposite the direction of the incident light.

The second wavelength converter 36 in the present embodiment contains a red phosphor that is excited by the excitation light BL2 and emits red light. Specifically, the second wavelength converter 36 contains, for example, a YAG-based phosphor made of $(Y_{1-x}, Gd_x)_3(Al, Ga)_5O_{12}$ with any of Pr, Eu, and Cr dispersed as an activator (any of Pr:YAG, Eu:YAG, and Cr:YAG). The activator may contain one element selected from Pr, Eu, and Cr or may be a co-activated activator containing a plurality of elements selected from Pr, Eu, and Cr.

The second wavelength converter 36 emits, in the direction −X the red light RL, which is fluorescence having the red wavelength band formed of wavelengths longer than those in the blue wavelength band of the excitation light BL2 incident from the second optical member 23 along the direction +X. The red light RL is unpolarized red light that is the mixture of the S-polarized component and the P-polarized component and has a wavelength band ranging, for example, from 600 to 800 nm.

The fluorescence having the red wavelength band in the present embodiment, that is, the unpolarized red light RL corresponds to the third light having a third wavelength band in the appended claims.

The red light RL emitted from the second wavelength converter 36 passes through the third light collector 35 along the direction −X, is substantially parallelized by the third light collector 35, then passes through the first retardation element 24, and is incident on the second optical member 23. The first retardation element 24 does not affect the polarization state of the unpolarized red light RL.

The second wavelength converter 36 in the present embodiment is a fixed wavelength converter and may be replaced with a rotary wavelength converter including a rotator that rotates the second wavelength converter 36 around an axis of rotation parallel to the axis Z. In this case, an increase in the temperature of the second wavelength converter 36 can be suppressed, whereby the wavelength conversion efficiency can be increased.

The fourth optical layer 232 of the second optical member 23 transmits light having the red wavelength band irrespective of the polarization direction of the light, as described above. The red light RL incident on the fourth optical layer 232 therefore passes through the second transparent substrate 230 and is incident on the third optical layer 231.

The third optical layer 231 of the second optical member 23 transmits light formed of the P-polarized component and reflects light formed of the S-polarized component out of light having the red wavelength band, as described above. The third optical layer 231 therefore reflects S-polarized red light RLs in the direction +Z and transmits P-polarized red light RLp in the direction −X out of the red light RL.

The second optical member 23 thus allows the S-polarized green light GLs to exit in the direction +Z and the P-polarized red light RLp to exit in the direction −X out of the red light RL emitted from the second wavelength converter 36.

Configuration of Optical Element

The optical element 31 in the present embodiment is disposed between the first optical member 22 and the second optical member 23 in the direction along the axis X. The optical element 31 is formed of a dichroic mirror characterized in that it reflects light having the red wavelength band and transmits light having the other wavelength bands, that is, the blue wavelength band or the green wavelength band. The optical element 31 therefore transmits the blue light BLp having the blue wavelength band and outputted from the light source section 21 in the direction +X and the green light GLs having the green wavelength band and having exited out of the second optical member 23 in the direction −X and reflects in the direction +X the red light RLp having the red wavelength band and having exited out of the second optical member 23 in the direction −X. The red light RLp reflected off the optical element 31 passes through the second optical member 23 and is incident on the first retardation element 24.

Configuration of First Retardation Element

The first retardation element 24 is disposed in a position shifted in the direction +X from the second optical member 123. That is, the first retardation element 24 is disposed on the axis X between the second optical member 23 and the second wavelength converter 36. The first retardation element 24 is formed of a quarter-wave plate for the red wavelength band. The first retardation element 24 is formed of a wavelength-selective retardation element characterized in that it imparts a quarter retardation of the wavelengths in the red wavelength band to red light but no retardation to light having a wavelength band other than the red wavelength band, that is, blue light and green light. The wavelength-selective retardation element can specifically be ColorSelect (product name, manufactured by ColorLink Japan, Ltd.). The first retardation element 24 thus imparts the quarter retardation only to light having the red wavelength band. The excitation light BL2, which is light having the blue wavelength band, therefore passes through the first retardation element 24 and enters the third light collector 35.

In the present embodiment, the excitation light BL2 having passed through the first retardation element 24 is entirely used for excitation of the second wavelength converter 36 irrespective of the polarization state of the excitation light BL2. A retardation element having no wavelength selectivity may therefore be used as the first retardation element 24.

The red light RLp is converted by the first retardation element 24 into, for example, left-handed circularly polarized red light RLc1, which then exits toward the third light collector 35. That is, the first retardation element 24 converts the polarization state of the red light RLp incident thereon.

Figure 4:
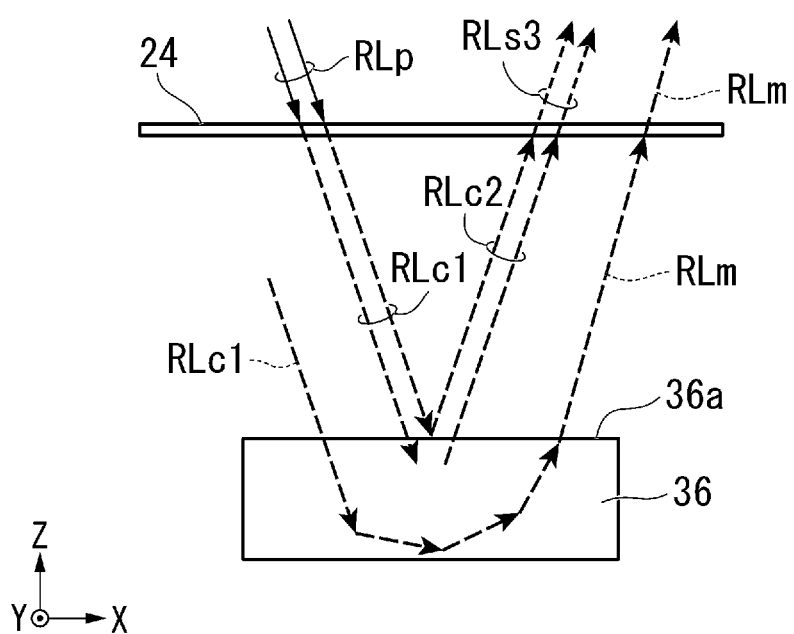
FIG. 4 is a diagrammatic view showing the polarization state of red light incident on a second wavelength converter.

The converted left-handed circularly polarized red light RLc1 from the first retardation element 24 is incident on the second wavelength converter 36. FIG. 4 is a diagrammatic view showing the polarization state of the red light that passes through the first retardation element 24 and is incident on the second wavelength converter 36. In FIG. 4, the third light collector 35 is omitted for ease of illustration.

The red phosphor contained in the second wavelength converter 36 hardly absorbs externally incident red light and therefore also hardly absorbs the red light RLc1, as shown in FIG. 4. Therefore, the red light RLc1 incident on the first wavelength converter 28 is repeatedly reflected inside the second wavelength converter 36 and exits out of the second wavelength converter 36 as unpolarized red light that is the mixture of S polarized light and P-polarized light along with the red light RL generated by the red phosphor. Unpolarized red light RLm is emitted from the second wavelength converter 36.

Out of the red light RLc1 incident on the second wavelength converter 36, light reflected off a surface 36a of the second wavelength converter 36 or light backscattered by the surface layer of the second wavelength converter 36 is unlikely to experience polarization disorder. The red light RLc1 reflected off the surface of the second wavelength converter 36 or backscattered by the second wavelength converter 36 therefore exits as right-handed circularly polarized red light RLc2 out of the second wavelength converter, as shown in FIG. 4.

That is, the second wavelength converter 36 in the present embodiment can emit the unpolarized red light RLm and the right-handed circularly polarized red light RLc2 in addition to the unpolarized red light RL generated by the red phosphor toward the second optical member 23.

The red light RLm emitted as unpolarized light from the second wavelength converter 36 is incident on the second optical member 23 with no change in the polarization state, that is, as unpolarized light even after passing through the first retardation element 24.

The unpolarized red light RLm incident on the second optical member 23 passes through the fourth optical layer 232 and the second transparent substrate 230 and is incident on the third optical layer 231, as the red light RL is. The unpolarized red light RLm is then separated by the third optical layer 231 into P-polarized red light RLp2 and S-polarized red light RLs2. That is, the S-polarized red light RLs2 is reflected in the direction +Z, and the P-polarized red light RLp2 exits in the direction −X and is reflected off the optical element 31 again in the direction +X. The P-polarized red light RLp2 reflected off the optical element 31 returns to the second wavelength converter 36 again via the first retardation element 24 and exits as unpolarized or circularly polarized light out of the second wavelength converter 36, as the red light RLp does.

On the other hand, the right-handed circularly polarized red light RLc2 emitted from the second wavelength converter 36 is incident on the first retardation element 24 again, which converts the red light RLc2 into S-polarized red light RLs3, which is incident on the second optical member 23. The red light RLs3 incident on the second optical member 23 is reflected off the third optical layer 231 in the direction +Z, as the red light RL is.

The light source apparatus 2 according to the present embodiment thus allows the red light RLs2 and the red light RLs3 to be outputted as light having the red wavelength band in addition to the red light RLs in the direction +Z out of the second optical member 23. The red light RLs, the red light RLs2, and the red light RLs3 that exit out of the second optical member 23 are hereinafter collectively referred simply to as red light RLs4.

Configuration of Light Tunnel

Figure 5:
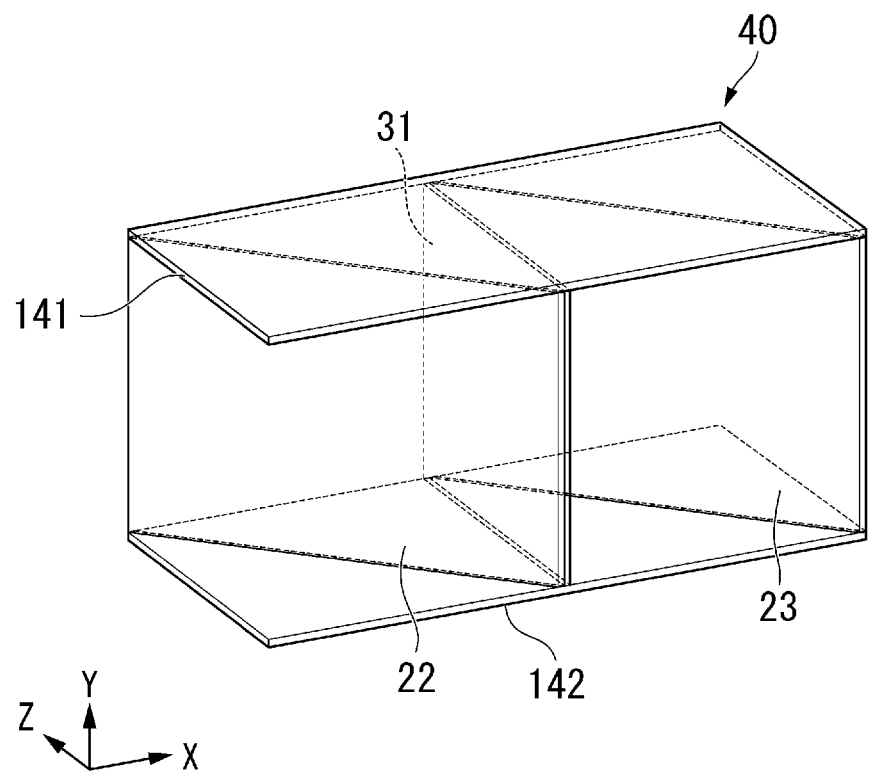
FIG. 5 is a perspective view showing the configuration of a light tunnel.
Figure 6:
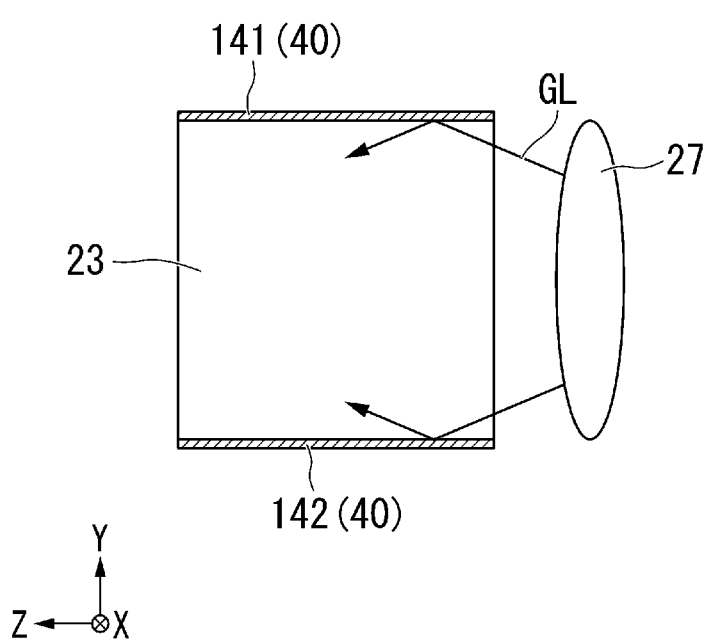
FIG. 6 is a side view of the light tunnel viewed in a direction X from the negative side toward the positive side thereof.

FIG. 5 is a perspective view showing the configuration of the light tunnel 40. FIG. 6 is a side view of the light tunnel 40 viewed in the direction X from the negative side toward the positive side thereof. FIG. 6 shows the green light GL incident on the second optical member 23 via the second light collector 27.

The light tunnel 40 includes a first mirror 141 and a second mirror 142, as shown in FIG. 5. The first transparent substrate 220 and the second transparent substrate 230 are bonded to the first mirror 141 and the second mirror 142, for example, with an adhesive. The light tunnel 40 formed of the first mirror 141 and the second mirror 142 is so configured that the surfaces thereof facing the first optical member 22 and the second optical member 22 are all reflection surfaces. The thus configured light tunnel 40, which reflects the divergent light traveling toward the downstream optical elements, has the function of suppressing optical loss. The light tunnel 40 also functions as a support member that supports the first transparent substrate 220 and the second transparent substrate 230.

The first mirror 141 is disposed in a position shifted in the direction +Y from the first transparent substrate 220 and the second transparent substrate 230. The first mirror 141 is so configured that at least the inner surface facing the first transparent substrate 220 and the second transparent substrate 230 forms a light reflection surface.

The second mirror 142 is disposed in a position shifted in the direction −Y from the first transparent substrate 220 and the second transparent substrate 230. The second mirror 142 is so configured that at least the inner surface facing the first transparent substrate 220 and the second transparent substrate 230 forms a light reflection surface. The first mirror 141 and the second mirror 142 are disposed along the plane XZ and face each other.

In the present embodiment, the direction +Y corresponds to the fifth direction in the appended claims, and the direction −Y corresponds to the sixth direction in the appended claims.

In the present embodiment, the green light GL emitted from the first wavelength converter 28 is substantially parallelized by the second light collector 27, but part of the green light GL diverges and is incident on the second optical member 23. Consider now, as a light source apparatus according to Comparative Example, a configuration in which the light tunnel 40 is removed from the light source apparatus 2 according to the present embodiment.

The second optical member 23 is a plate-shaped polarization separator. Therefore, when the light tunnel 40 is not provided, as in the light source apparatus according to Comparative Example, part of the green light GL having exited out of the second light collector 27 spreads outward beyond the second optical member 23 and cannot be incident on the second optical member 23, which can undesirably reduce the light utilization efficiency of the green light GL. When a plate-type polarization separator is used as the second optical member 23, light that exits at wide angles out of the second light collector 27 can be refracted at the prism surface and captured by the second optical member 23, but the advantages resulting from using a plate-type polarization separator, such as ease of film design, are no longer available.

In contrast, since the light source apparatus 2 according to the present embodiment includes the light tunnel 40, the green light GL having spread in the direction Y is reflected off the first mirror 141 and the second mirror 142 and can therefore be captured by the second optical member 23, as shown in FIG. 6. The light utilization efficiency of the green light GL can thus be improved.

Furthermore, the blue light BLp having exited out of the first light collector 25 and spreading in the direction Y is also reflected off the first mirror 141 and the second mirror 142 and can therefore be efficiently captured by the first optical member 22. The light utilization efficiency of the blue light BLp can thus be improved. Moreover, the red light RLp, the red light RLm, and the red light RLs3 having exited out of the third light collector 35 and spreading in the direction Y are also reflected off the first mirror 141 and the second mirror 142 and can therefore be efficiently captured by the second optical member 23. The light utilization efficiency of the red light RLp, the red light RLm, and the red light RLs3 can thus be improved. Furthermore, the first light BL outputted from the light source section 21 and spreading in the direction Y is also reflected off the first mirror 141 and the second mirror 142 and can therefore be efficiently captured by the first optical member 22. The light utilization efficiency of the first light BL can thus be improved.

Configuration of First Color Separator

Figure 7:
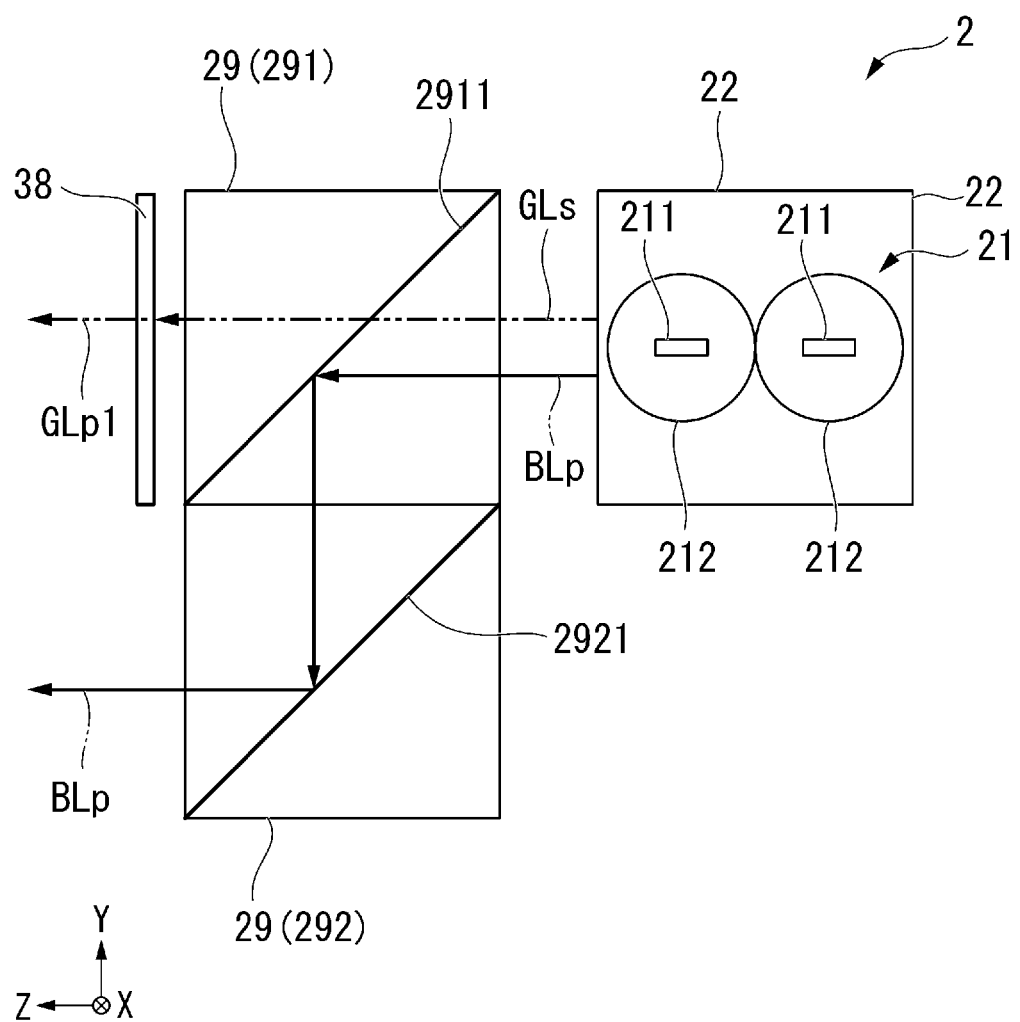
FIG. 7 is a side view of the light source apparatus viewed in a direction −X.

FIG. 7 is a side view of the light source apparatus 2 viewed in the direction −X. That is, FIG. 7 shows the first color separator 29 and the fourth retardation element 38, and other components viewed in the direction −X. In FIG. 7, the second retardation element 37, the first light collector 25, and the diffuser 26, and other components are omitted for ease of illustration.

The first color separator 29 is disposed in a position shifted in the direction +Z from the first optical member 22, as shown in FIG. 7. The first color separator 29 includes a dichroic prism 291 and a reflection prism 292. The dichroic prism 291 and the reflection prism 292 are arranged side by side along the axis Y. The first color separator 29 separates the light having exited out of the first optical member 22 along the direction +Z into the blue light BLp and the green light GLs.

The light containing the blue light BLp and the green light GLs and having exited out of the first optical member 22 enters the dichroic prism 291. The dichroic prism 291 is formed of a prism-shaped color separator that is the combination of two bases each having a substantially right-angled isosceles triangular columnar shape and has a substantially rectangular solid shape as a whole. A color separation layer 2911 is provided at the interface between the two bases. The color separation layer 2911 inclines by 45° with respect to the axes Y and Z. In other words, the color separation layer 2911 inclines by 45° with respect to the planes XY and YZ.

The color separation layer 2911 functions as a dichroic mirror that reflects a blue light component and transmits color light having a wavelength band formed of wavelengths longer than those in the blue wavelength band, that is, a green light component, out of the light incident on the color separation layer 2911. Therefore, out of the light having entered the dichroic prism 291 from the first optical member 22, the green light GLs passes through the color separation layer 2911 in the direction +Z and exits out of the dichroic prism 291.

On the other hand, out of the light having entered the dichroic prism 291 from the first optical member 22, the blue light BLp is reflected off the color separation layer 2911 in the direction −Y. In the present embodiment, the blue light BLp is light formed of the S-polarized component with respect to the color separation layer 2911 of the dichroic prism 291, and the green light GLs is light formed of the P-polarized component with respect to the color separation layer 2911 of the dichroic prism 291. That is, the color separation layer 2911 in the present embodiment reflects the blue light BLp incident as light formed of the S-polarized component and transmits the green light GLs incident as light formed of the P-polarized component. In general, a color separation layer readily reflects light formed of the S-polarized component and readily transmits light formed of the P-polarized component. Since the color separation layer 2911 in the present embodiment only needs to be designed so as to transmit P-polarized light and reflect S-polarized light as described above, the color separation layer 2911 can be readily designed as a film.

The dichroic prism 291 may be replaced with a dichroic mirror including the color separation layer 2911. The first color separator 29 may be formed of the reflection prism 292 and a polarization separator including a polarization separation layer. Even when the first color separator 29 employs in place of the dichroic prism 291, for example, a polarization separator that transmits the incident blue light BLp in the direction +Z and reflects the incident green light GLs in the direction −Y toward the reflection prism 292, the blue light BLp and the green light GLs can be separated from each other as in the case of the first color separator 29 including the dichroic prism 291.

The reflection prism 292 is disposed in a position shifted in the direction −Y from the dichroic prism 291. The blue light BLp reflected off the color separation layer 2911 enters the reflection prism 292. The reflection prism 292 is a prism-shaped reflector that is the combination of two bases each having a substantially right-angled isosceles triangular columnar shape and has a substantially rectangular solid shape as a whole. A reflection layer 2921 is provided at the interface between the two bases. The reflection layer 2921 inclines by 45° with respect to the directions +Y and +Z. In other words, the reflection layer 2921 inclines by 45° with respect to the planes XY and YZ. That is, the reflection layer 2921 and the color separation layer 2911 are disposed in parallel to each other.

The reflection layer 2921 reflects in the direction +Z the blue light BLp incident from the dichroic prism 291 in the direction −Y. The blue light BLp reflected off the reflection layer 2921 exits out of the reflection prism 292 in the direction +Z. The reflection prism 292 may be replaced with a reflection mirror including the reflection layer 2921.

Configuration of Fourth Retardation Element

The fourth retardation element 38 is disposed in a position shifted in the direction +Z from the dichroic prism 291. In other words, the fourth retardation element 38 is disposed in the optical path of the green light GLs having exited out of the dichroic prism 291. The fourth retardation element 38 is formed of a half-wave plate for the green wavelength band of the green light GLs incident on the fourth retardation element 38. The fourth retardation element 38 converts the green light GLs incident from the dichroic prism 291 into P-polarized green light GLp1. The converted P-polarized green light GLp1 from the fourth retardation element 38 is outputted in the direction +Z from the light source apparatus 2 and enters the homogenizer 4 shown in FIG. 1. The fourth retardation element 38 may be provided so as to be in contact with a surface of the dichroic prism 291 that is the surface via which the green light GLs exits.

The green light GLp1 is spatially separated from the blue light BLp, exits via a light exiting position different from the light exiting position via which the blue light BLp exits out of the light source apparatus 2, and enters the homogenizer 4. In detail, the green light GLp1 exits via a light exiting position separate in the direction +Y from the light exiting position via which the blue light BLp exits out of the light source apparatus 2 and enters the homogenizer 4.

Configuration of Second Color Separator

Figure 8:
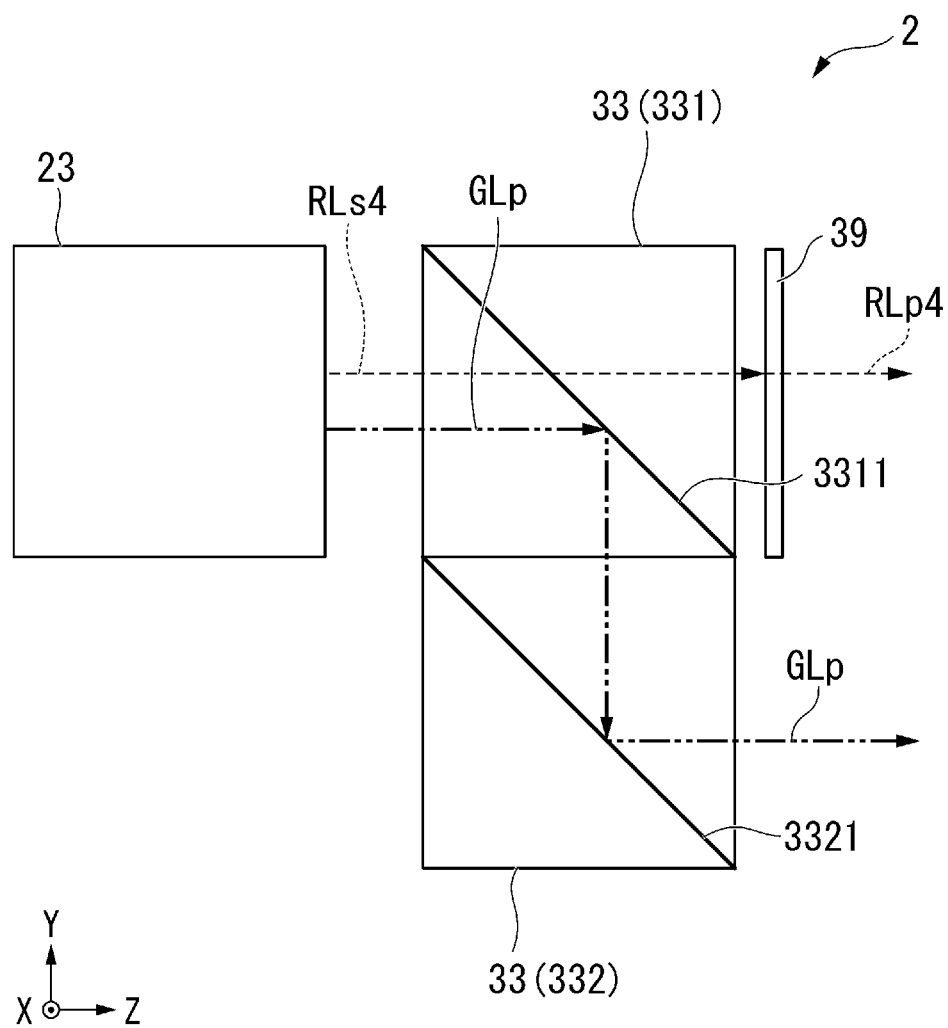
FIG. 8 is a side view of the light source apparatus viewed in a direction +X.

FIG. 8 is a side view of the light source apparatus 2 viewed in the direction +X. In other words, FIG. 8 shows the fifth retardation element 39 and the second color separator 33 viewed in the direction +X. In FIG. 8, the second wavelength converter 36, the second light collector 27, and the first wavelength converter 28 are omitted.

The second color separator 33 is disposed in a position shifted in the direction +Z from the second optical member 23, as shown in FIG. 8. The second color separator 33 includes a dichroic prism 331 and a reflection prism 332. The dichroic prism 331 and the reflection prism 332 are arranged side by side along the axis Y. The second color separator 33 separates the light having exited out of the second optical member 23 in the direction +Z into the green light GLp and the red light RLs4.

The dichroic prism 331 is formed of a prism-shaped color separator, as the dichroic prism 291 is. A color separation layer 3311 is provided at the interface between the two bases. The color separation layer 3311 inclines by 45° with respect to the directions +Y and +Z. In other words, the color separation layer 3311 inclines by 45° with respect to the planes XY and YZ. The color separation layer 3311 and the reflection layer 3321 are disposed in parallel to each other.

The color separation layer 3311 functions as a dichroic mirror that reflects the green light component and transmits a red light component of the light incident on the color separation layer 3311. Therefore, out of the light having entered the dichroic prism 331 from the second optical member 23, the red light RLs4 passes through the color separation layer 3311 in the direction +Z and exits out of the dichroic prism 331.

On the other hand, out of the light having entered the dichroic prism 331 from the second optical member 23, the green light GLp is reflected off the color separation layer 3311 in the direction −Y. In the present embodiment, the green light GLp is formed of the S-polarized component with respect to the color separation layer 3311 of the dichroic prism 331, and the red light RLs4 is formed of the P-polarized component with respect to the color separation layer 3311 of the dichroic prism 331. That is, the color separation layer 3311 in the present embodiment reflects the green light GLp incident as light formed of the S-polarized component and transmits the red light RLs4 incident as light formed of the P-polarized component. In general, since a color separation layer readily reflects S-polarized light and readily transmits P-polarized light, the color separation layer 3311 in the present embodiment, which is designed to transmit P-polarized light and reflect S-polarized light as described above, is readily designed as a film.

The dichroic prism 331 may be replaced with a dichroic mirror including the color separation layer 3311.

The reflection prism 332 is disposed in a position shifted in the direction −Y from the dichroic prism 331. The reflection prism 332 has the same configuration as that of the reflection prism 292. That is, the reflection prism 332 includes the reflection layer 3321 parallel to the color separation layer 3311 and the reflection layer 2921.

The reflection layer 3321 reflects in the direction +Z the green light GLp reflected off the color separation layer 3311 and incident on the reflection layer 3321. The green light GLp reflected off the reflection layer 3321 exits out of the reflection prism 332. The reflection prism 332 may be replaced with a reflection mirror including the reflection layer 3321.

Configuration of Fifth Retardation Element

The fifth retardation element 39 is disposed in a position shifted in the direction +Z from the dichroic prism 331. In other words, the fifth retardation element 39 is disposed in the optical path of the red light RLs4 having exited out of the dichroic prism 331. The fifth retardation element 39 is formed of a half-wave plate for the red wavelength band of the red light RLs4 incident on the fifth retardation element 39. The fifth retardation element 39 converts the red light RLs4 incident from the dichroic prism 331 into P-polarized red light RLp4. The converted P-polarized red light RLp4 from the fifth retardation element 39 is outputted in the direction +Z from the light source apparatus 2 and enters the homogenizer 4 shown in FIG. 1. The fifth retardation element 39 may be provided so as to be in contact with a surface of the dichroic prism 331 that is the surface via which the red light RLs4 exits.

The red light RLp4 is spatially separated from the green light GLp, exits via a light exiting position different from the light exiting position via which the green light GLp exits out of the light source apparatus 2, and enters the homogenizer 4. That is, the red light RLp4 is spatially separated from the blue light BLp, the green light GLp1, and the green light GLp, exits via a position different from the positions via which the blue light BLp, the green light GLp1, and the green light GLp exit, and enters the homogenizer 4. In other words, the red light RLp4 exits via a light exiting position separate in the direction +Y from the light exiting position via which the green light GLp exits out of the light source apparatus 2 and separate in the direction +X from the light exiting position via which the green light GLp1 exits out of the light source apparatus 2 and enters the homogenizer 4.

Configuration of Homogenizer

The homogenizer 4 homogenizes the illuminance in an image formation area of the light modulator 6, which is irradiated with the light outputted from the light source apparatus 2, as shown in FIG. 1. The homogenizer 4 includes a first multi-lens 41, a second multi-lens 42, and a superimposing lens 43.

The first multi-lens 41 includes a plurality of lenses 411 arranged in a matrix in a plane perpendicular to the center axis of the light L incident from the light source apparatus 2, that is, the illumination optical axis Ax. The plurality of lenses 411 of the first multi-lens 41 divide the light incident from the light source apparatus 2 into a plurality of sub-luminous fluxes.

Figure 9:
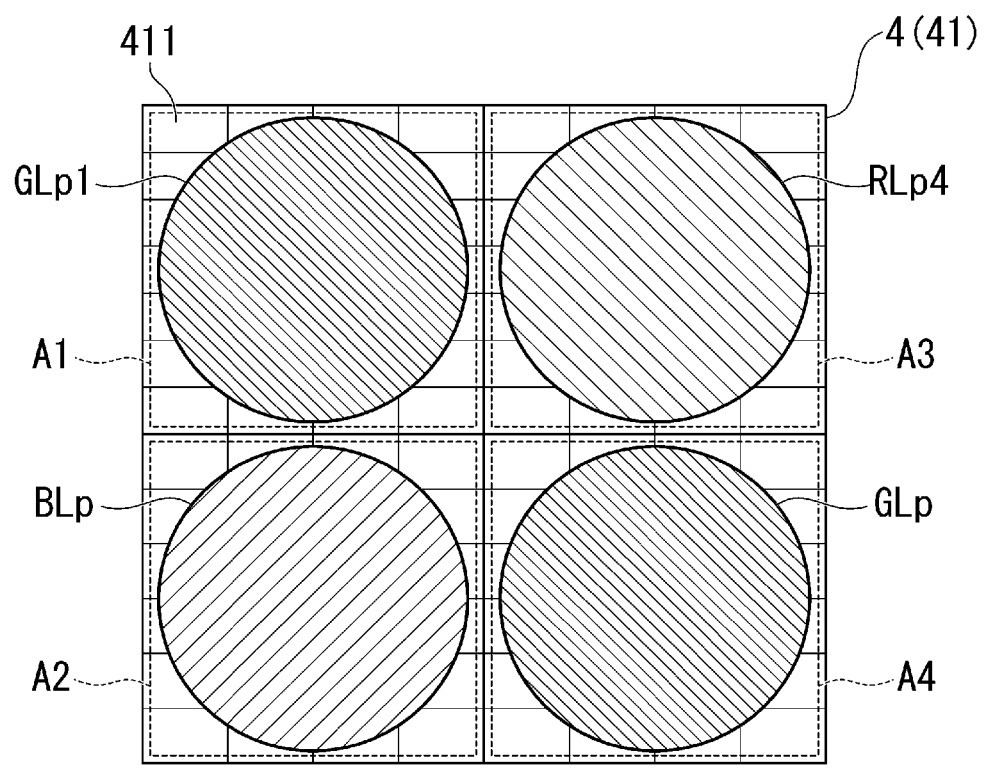
FIG. 9 is a diagrammatic view showing color luminous flux incident positions on a multi-lens.

FIG. 9 is a diagrammatic view showing the color luminous flux incident positions on the first multi-lens 41 viewed in the direction −Z.

The green light GLp1, the blue light BLp, the red light RLp4, and the green light GLp outputted from the light source apparatus 2 enter the first multi-lens 41, as shown in FIG. 9. The green light GLp1 outputted from the light source apparatus 2 via the position shifted in the directions −X and +Y enters a plurality of lenses 411 contained in an area A1 of the first multi-lens 41 that is the area shifted in the directions −X and +Y. The blue light BLp outputted from the light source apparatus 2 via the position shifted in the directions −X and −Y enters a plurality of lenses 411 contained in an area A2 of the first multi-lens 411 that is the area shifted in the directions −X and −Y.

The red light RLp4 outputted from the light source apparatus 2 via the position shifted in the directions +X and +Y enters a plurality of lenses 411 contained in an area A3 of the first multi-lens 41 that is the area shifted in the directions +X and +Y. The green light GLp outputted from the light source apparatus 2 via the position shifted in the directions +X and −Y enters a plurality of lenses 411 contained in an area A4 of the first multi-lens 41 that is the area shifted in the directions +X and −Y. The color luminous fluxes having entered the lenses 411 form a plurality of sub-luminous fluxes, which enter lenses 421 of the second multi-lens 42 that correspond to the lenses 411.

Out of the light L outputted from the light source apparatus 2 according to the present embodiment, the green light GLp1 corresponds to the fourth light in the appended claims, the blue light BLp corresponds to the fifth light in the appended claims, the red light RLp4 corresponds to the sixth light in the appended claims, and the green light GLp corresponds to the seventh light in the appended claims.

The second multi-lens 42 includes a plurality of lenses 421 arranged in a matrix in a plane perpendicular to the illumination optical axis Ax and corresponding to the plurality of lenses 411 of the first multi-lens 41, as shown in FIG. 1. The lenses 421 receive the plurality of sub-luminous fluxes having exited out of the lenses 411 corresponding to the lenses 421. The lenses 421 cause the sub-luminous fluxes incident thereon to enter the superimposing lens 43.

The superimposing lens 43 superimposes the plurality of sub-luminous fluxes incident from the second multi-lens 42 with one another in the image formation area of the light modulator 6. In detail, the second multi-lens 42 and the superimposing lens 43 cause the green light GLp1, the blue light BLp, the red light RLp4, and the green light GLp, which each have been divided into a plurality of sub-luminous fluxes, to enter a plurality of microlenses 621, which form a microlens array 62, which will be described later, of the light modulator 6 via the field lens 5, at different angles.

Configuration of Light Modulator

The light modulator 6 modulates the light outputted from the light source apparatus 2, as shown in FIG. 1. In detail, the light modulator 6 modulates the color luminous fluxes outputted from the light source apparatus 2 and incident on the light modulator 6 via the homogenizer 4 and the field lens 5 in accordance with image information to form image light according to the image information. The light modulator 6 includes one liquid crystal panel 61 and one microlens array 62.

Configuration of Liquid Crystal Panel

Figure 10:
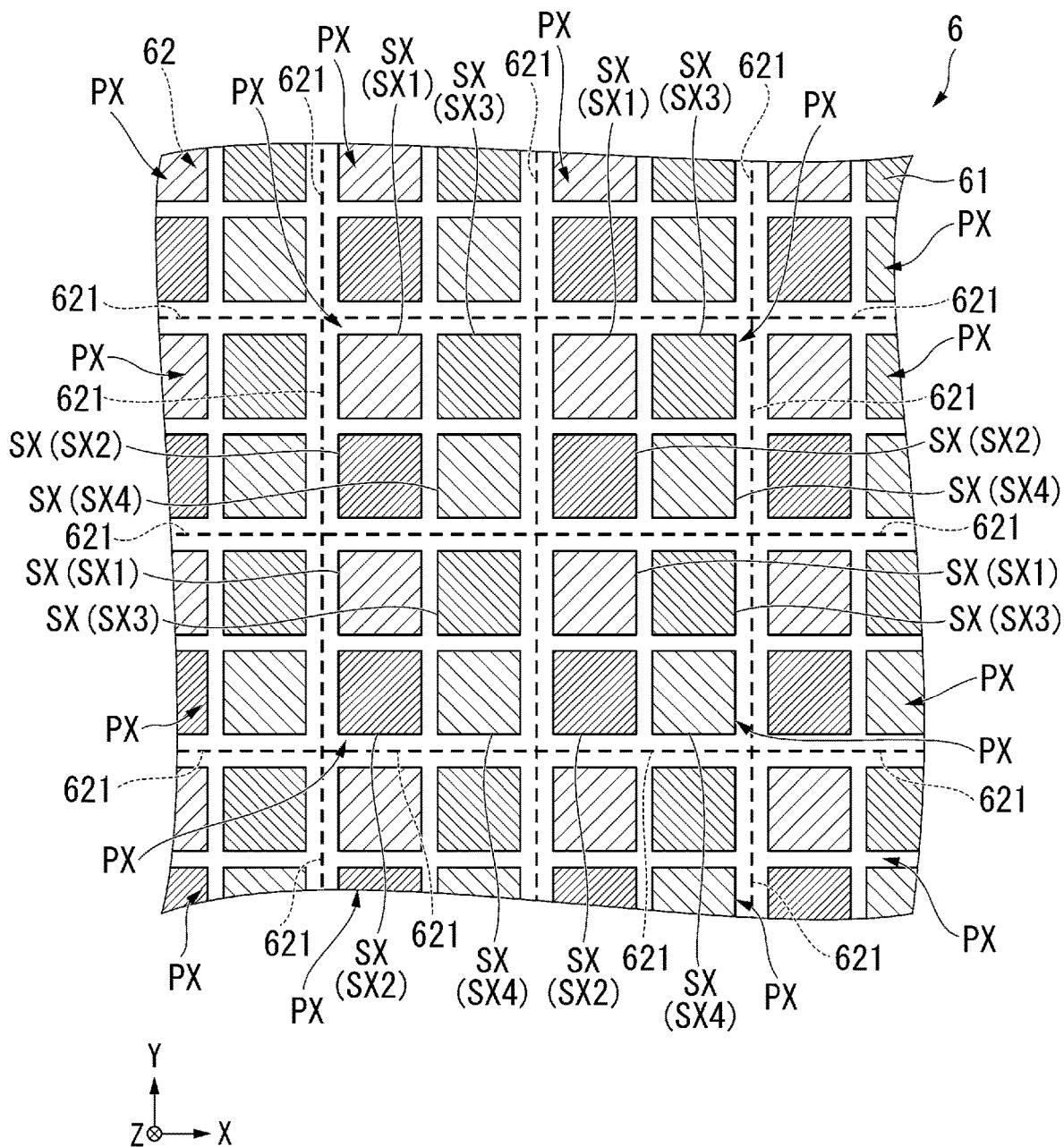
FIG. 10 is an enlarged view of a light modulator.

FIG. 10 is a diagrammatic enlarged view of part of the light modulator 6 viewed in the direction −Z. In other words, FIG. 10 shows the correspondence between pixels PX provided in the liquid crystal panel 61 and the microlenses 621 provided in the microlens array 62.

The liquid crystal panel 61 has a plurality of pixels PX arranged in a matrix in a plane perpendicular to the illumination optical axis Ax, as shown in FIG. 10.

The pixels PX each have a plurality of sub-pixels SX, which modulate color luminous fluxes having different colors from one another. In the present embodiment, the pixels PX each have four sub-pixels SX (SX1 to SX4). Specifically, in one pixel PX, a first sub-pixel SX1 is disposed in a position shifted in the directions −X and +Y. A second sub-pixel SX2 is disposed in a position shifted in the directions −X and −Y. A third sub-pixel SX3 is disposed in a position shifted in the directions +X and +Y. A fourth sub-pixel SX4 is disposed in a position shifted in the directions +X and −Y.

Configuration of Microlens Array

The microlens array 62 is provided in a position shifted in the direction −Z, which is the direction facing the light incident side, from the liquid crystal panel 61, as shown in FIG. 1. The microlens array 62 guides the color luminous fluxes that enter the microlens array 62 to the individual pixels PX. The microlens array 62 includes the plurality of microlenses 621 corresponding to the plurality of pixels PX.

The plurality of microlenses 621 are arranged in a matrix in a plane perpendicular to the illumination optical axis Ax, as shown in FIG. 10. In other words, the plurality of microlenses 621 are arranged in a matrix in a plane perpendicular to the center axis of the light incident from the field lens 5. In the present embodiment, one microlens 621 is provided in correspondence with two sub-pixels arranged in the direction +X and two sub-pixels arranged in the direction +Y. That is, one microlens 621 is provided in correspondence with four sub-pixels SX1 to SX4, which are arranged in two rows and two columns in the plane XY.

The green light GLp1, the blue light BLp, the red light RLp4, and the green light GLp superimposed on one another by the homogenizer 4 are incident on each of the microlenses 621 at angles different from one another. The microlenses 621 each cause each of the color luminous fluxes incident on the microlens 621 to be incident on the sub-pixel SX corresponding to the color luminous flux. Specifically, the microlenses 621 each cause the green light GLp1 to be incident on the first sub-pixel SX1, the blue light BLp to be incident on the second sub-pixel SX2, the red light RLp4 to be incident on the third sub-pixel SX3, and the green light GLp to be incident on the fourth sub-pixel SX4 among the sub-pixels SX of the pixel PX corresponding to the microlens 621. The sub-pixels SX1 to SX4 thus receive the color luminous fluxes corresponding to the sub-pixels SX1 to SX4 and modulate the corresponding color luminous fluxes. The image light thus modulated by the liquid crystal panel 61 is projected by the projection optical apparatus 7 onto the projection receiving surface that is not shown.

Effects of First Embodiment

In the related-art projector described in JP-A-4-60538, a lamp is used as the light source. Since the light outputted from the lamp does not have an aligned polarization direction, using a liquid crystal panel as the light modulator requires a polarization conversion section that achieves an aligned polarization direction. The projector typically uses a polarization conversion section including a multi-lens array and a polarization separator (PBS) array. To reduce the size of the projector, a small-interval multi-lens array and a small-interval PBS array are required, but it is very difficult to produce a small-interval PBS array.

To address the problem, in the present embodiment, a plurality of color luminous fluxes having an aligned polarization direction, that is, the P-polarized green light GLp1, the P-polarized blue light BLp, the P-polarized red light RLp4, and the P-polarized green light GLp, are outputted from the light source apparatus 2. According to the configuration described above, a light source apparatus 2 capable of outputting a plurality of color luminous fluxes spatially separated from one another and having an aligned polarization direction can be achieved without using a small-interval polarization converter, such as that described above. The size of the light source apparatus 2 can thus be reduced, and the size of the projector 1 can in turn be reduced.

In the projector 1 according to the present embodiment, the red component of the four color luminous fluxes can be generated by using the red light RL generated by the second wavelength converter 36. The thus generated red light RL has an increased amount of red component and an improved color gamut associated with the red light as compared with red light generated by separation of yellow fluorescence. The light source apparatus 2 according to the present embodiment can therefore improve the color reproducibility of the red component of a projected image.

Furthermore, in the projector 1 according to the present embodiment, since the green light is incident on two of the four sub-pixels SX of the light modulator 6, the sub-pixels SX2 and SX3, the amount of green light incident on the pixels PX can be increased. The visual sensitivity of a projected image can thus be increased.

The light source apparatus 2 according to the present embodiment includes the light source section 21, which outputs the first light BL having the blue wavelength band and containing the P-polarized blue light BLp and the S-polarized blue light BLs, the first optical member 22, which transmits in the direction +X the blue light BLp incident from the light source section 21 along the direction +X and reflects in the direction −Z the blue light BLs incident from the light source section 21 along the direction +X, the second optical member 23, which is disposed in a position shifted in the direction +X from the first optical member 22, reflects in the direction −Z a portion of the blue light BLp incident from the first optical member 22 along the direction +X, and transmits in the direction +X the other portion of the blue light BLp incident from the first optical member 22 along the direction +X, the diffuser plate 261, which is disposed in a position shifted in the direction −Z from the first optical member 22, diffuses the blue light BLc1 incident from the first optical member 22 along the direction −Z, and emits the diffused blue light BLc2 in the direction +Z, the first wavelength converter 28, which is disposed in a position shifted in the direction −Z from the second optical member 23, converts in terms of wavelength the portion of the blue light BLp incident from the second optical member 23 along the direction −Z, and emits the green light GL in the direction +Z, and the second wavelength converter 36, which is disposed in a position shifted in the direction +X from the second optical member 23, converts in terms of wavelength the other portion of the blue light BLp incident from the second optical member 23 along the direction +X, and emits the red light RL in the direction −X. The second optical member 23 receives the green light GL from the first wavelength converter 28 along the direction +Z, transmits the green light GLp in the direction +Z, and reflects the green light GLs in the direction −X. The second optical member 23 receives at least the red light RL from the second wavelength converter 36 along the direction −X and reflects the red light RLs in the direction +Z. The first optical member 22 transmits the blue light BLp emitted from the diffuser plate 261 along the direction +Z and reflects in the direction +Z the green light GLs incident from the second optical member 23 along the direction −X.

The light source apparatus 2 according to the present embodiment can use the separated P-polarized blue light BLp as the excitation light BL1, which excites the first wavelength converter 28, and as the excitation light BL2, which excites the second wavelength converter 36. In this case, since an optical film having the half-silvered mirror function can be used as the fourth optical layer 232 of the second optical member 23, the fourth optical layer 232 does not need to transmit 100% of the P-polarized blue light BLp.

As described above, in the light source apparatus according to the present embodiment, the dielectric multilayer film that forms the fourth optical layer 232 is not required to have special characteristics, such as 100% transmission of P-polarized light. The dielectric multilayer film that forms the fourth optical layer 232 is therefore readily formed. Specifically, since the number of layers of the dielectric multilayer film can be reduced, the manufacturing cost of the dielectric multilayer film can be reduced and the yield thereof can be improved. The light source apparatus 2 according to the present embodiment thus allows reduction in the design cost of the second optical member 23 including the fourth optical layer 232 and in turn the cost of the entire light source apparatus.

The light source apparatus 2 according to the present embodiment further includes the optical element 31, which reflects in the direction +X the red light RLp having passed through the second optical member 23 and incident on the optical element 31 along the direction −X.

The configuration described above allows the red light RLp having passed through the second optical member 23 to be incident on the second wavelength converter 36 and the unpolarized red light RLm to be emitted along with the red light RL from the second wavelength converter 36. The S-polarized red light RLs2, which is part of the unpolarized red light RLm, exits in the direction +Z from the second optical member 23, as the red light RL does.

In the present embodiment, the red light RLs2 can be extracted as part of the red light RLs4. That is, part of the red component separated by the second optical component 23 from the red light RL can be reused as the red light RLs4, whereby the light utilization efficiency of the red component can be improved. The color reproducibility of the red component of a projected image can therefore be improved.

The light source apparatus 2 according to the present embodiment further includes the first retardation element 24, which is provided between the second optical member 23 and the second wavelength converter 36 and imparts a quarter retardation to the red light RL.

According to the configuration described above, in which the first retardation element 24 is provided between the second optical member 23 and the second wavelength converter 36, the circularly polarized red light RLc2 emitted from the second wavelength converter 36 can be converted into the S-polarized red light RLs, which is reflected off the second optical member 23 and can exit out of the light source apparatus 2. The light emitted from the second wavelength converter 36 can thus be used more efficiently.

The light source apparatus 2 according to the present embodiment further includes the second retardation element 37, which is provided between the first optical member 22 and the diffuser 26 and on which the blue light BLs is incident from the first optical member 22 along the direction −Z.

According to the configuration described above, since the second retardation element 37 is provided between the first optical member 22 and the diffuser 26, the circularly polarized blue light BLc2 emitted from the diffuser 26 can be converted into the P-polarized blue light BLp, which can pass through the first optical member 22. The blue light BLc2 emitted from the diffuser 26 can thus be used more efficiently.

In the light source apparatus 2 according to the present embodiment, the light source section 21 includes the light emitters 211 and the third retardation element 2131, on which the light outputted from the light emitters 211 is incident and out of which the first light BL exits.

According to the configuration described above, since the light source section 21 includes the third retardation element 2131, the P-polarized blue light BLp and the S-polarized blue light BLs can be reliably incident on the first optical member 22. Furthermore, according to the configuration described above, since the luminous fluxes outputted from the plurality of light emitters 211 may have the same polarization direction, solid-state light sources of the same type may be disposed in the same orientation, whereby the configuration of the light source section 21 can be simplified.

In the light source apparatus 2 according to the present embodiment, the third retardation element 2131 is rotatable around the axis of rotation R2 along the traveling direction of the light incident on the third retardation element 2131.

According to the configuration described above, in which the third retardation element 2131 is rotatable around the axis of rotation R2 along the direction +X, adjusting the angle of rotation of the third retardation element 2131 allows adjustment of the ratio between the amount of blue light BLs and the amount of blue light BLp to be incident on the first optical member 22. The ratio among the amounts of green light GLp1, blue light BLp, red light RLp4, and green light GLp outputted from the light source apparatus 2 can thus be adjusted, whereby the white balance of the light from the light source apparatus 2 can be adjusted.

The light source apparatus 2 according to the present embodiment further includes the first mirror 141, which is disposed in a position shifted in the direction +Y from the first optical member 22 and the second optical member 23, and the second mirror 142, which is provided so as to face the first mirror 141 and disposed in a position shifted in the direction −Y from the first optical member 22 and the second optical member 23.

The blue light BLc2 emitted from the diffuser 26 is substantially parallelized by the first light collector 25, but part of the blue light BLc2 diverges and is incident on the first optical member 22, as described above. The green light GL emitted from the first wavelength converter 28 is substantially parallelized by the second light collector 27, but part of the green light GL diverges and is incident on the second optical member 23. The red light RL emitted from the second wavelength converter 36 is substantially parallelized by the third light collector 35, but part of the red light RL diverges and is incident on the second optical member 23.

In contrast, in the present embodiment, since the light tunnel 40, which sandwiches the first optical member 22 and the second optical member 23 in the direction Y, is provided, the light spreading in the direction Y is reflected off the first mirror 141 and the second mirror 142 and can therefore be captured by the first optical member 22 or the second optical member 23.

The plate-shaped first optical member 22 and second optical member 23 can thus efficiently capture the light emitted from the diffuser 26, the first wavelength converter 28, and the second wavelength converter 36.

The light source apparatus 2 according to the present embodiment further includes the first color separator 29, which is disposed in a position shifted in the direction +Z from the first optical member 22 and separates the light having exited out of the first optical member 22 into the green light GLp1 and the blue light BLp, and the second color separator 33, which is disposed in a position shifted in the direction +Z from the second optical member 23 and separates the light having exited out of the second optical member 23 into the red light RLp4 and the green light GLp.

According to the configuration described above, the green light GLp1, the blue light BLp, the red light RLp4, and the green light GLp can be outputted from the light source apparatus 2.

In the present embodiment, since the fourth retardation element 38 is disposed in the optical path of the green light GLs having exited out of the dichroic prism 291, the green light GLs can be converted into the P-polarized green light GLp1. The green light GLp1 and the blue light BLp that exit out of the first color separator 29 can each be light formed of the P-polarized component.

In the present embodiment, since the fifth retardation element 39 is disposed in the optical path of the red light RLs4 having exited out of the dichroic prism 331, the red light RLs4 can be converted into the P-polarized red light RLp4. The red light RLp4 and the green light GLp that exit out of the second color separator 33 can each be light formed of the P-polarized component.

The green light GLp1, the blue light BLp, the red light RLp4, and the green light GLp outputted from the light source apparatus 2 can therefore each be light formed of the P-polarized component.

In the present embodiment, since the light source apparatus 2 includes the first light collector 25, which collects the blue light BLs toward the diffuser 26, the first light collector 25 can efficiently collect the blue light BLc1 having exited out of the first retardation element 24 on the diffuser 26 and can also substantially parallelize the blue light BLc2 emitted from the diffuser 26. Loss of the blue light BLs can thus be suppressed, whereby the blue light BLs can be used more efficiently.

In the present embodiment, since the light source apparatus 2 includes the second light collector 27, which collects the excitation light BL1 toward the first wavelength converter 28, the second light collector 27 can efficiently collect the excitation light BL1 on the first wavelength converter 28 and can also parallelize the green light GL emitted from the first wavelength converter 28. Loss of the green light GL can thus be suppressed, whereby the green light GL can be used more efficiently.

In the present embodiment, since the light source apparatus 2 includes the third light collector 35, which collects the excitation light BL2 toward the second wavelength converter 36, the third light collector 35 can efficiently collect the excitation light BL2 onto the second wavelength converter 36 and further parallelize the red light RL emitted from the second wavelength converter 36. Loss of the red light RL can thus be suppressed, whereby the red light RL can be used more efficiently.

In the present embodiment, since the projector 1 includes the homogenizer 4 located between the light source apparatus 2 and the light modulator 6, the light modulator 6 can be uniformly illuminated with the green light GLp1, the blue light BLp, the red light RLp4, and the green light GLp outputted from the light source apparatus 2. Unevenness in color and brightness of a projected image can thus be suppressed.

In the present embodiment, since the light modulator 6 includes the microlens array 62 including the plurality of microlenses 621 corresponding to the plurality of pixels PX, the microlenses 621 allow the four color luminous fluxes incident on the light modulator 6 to be incident on the corresponding four sub-pixels SX of the liquid crystal panel 61. The color luminous fluxes outputted from the light source apparatus 2 can thus be efficiently incident on the sub-pixels SX, whereby the color luminous fluxes can be used more efficiently.

Second Embodiment

A second embodiment of the present disclosure will be described below with reference to FIG. 11.

The basic configuration of the light source apparatus according to the second embodiment is the same as that according to the first embodiment, but the configuration in which part of the red light RL is caused to return to the second wavelength converter 36 differs from that in the first embodiment. The overall configuration of the light source apparatus that is the same as the overall configuration in the first embodiment is therefore omitted.

Figure 11:
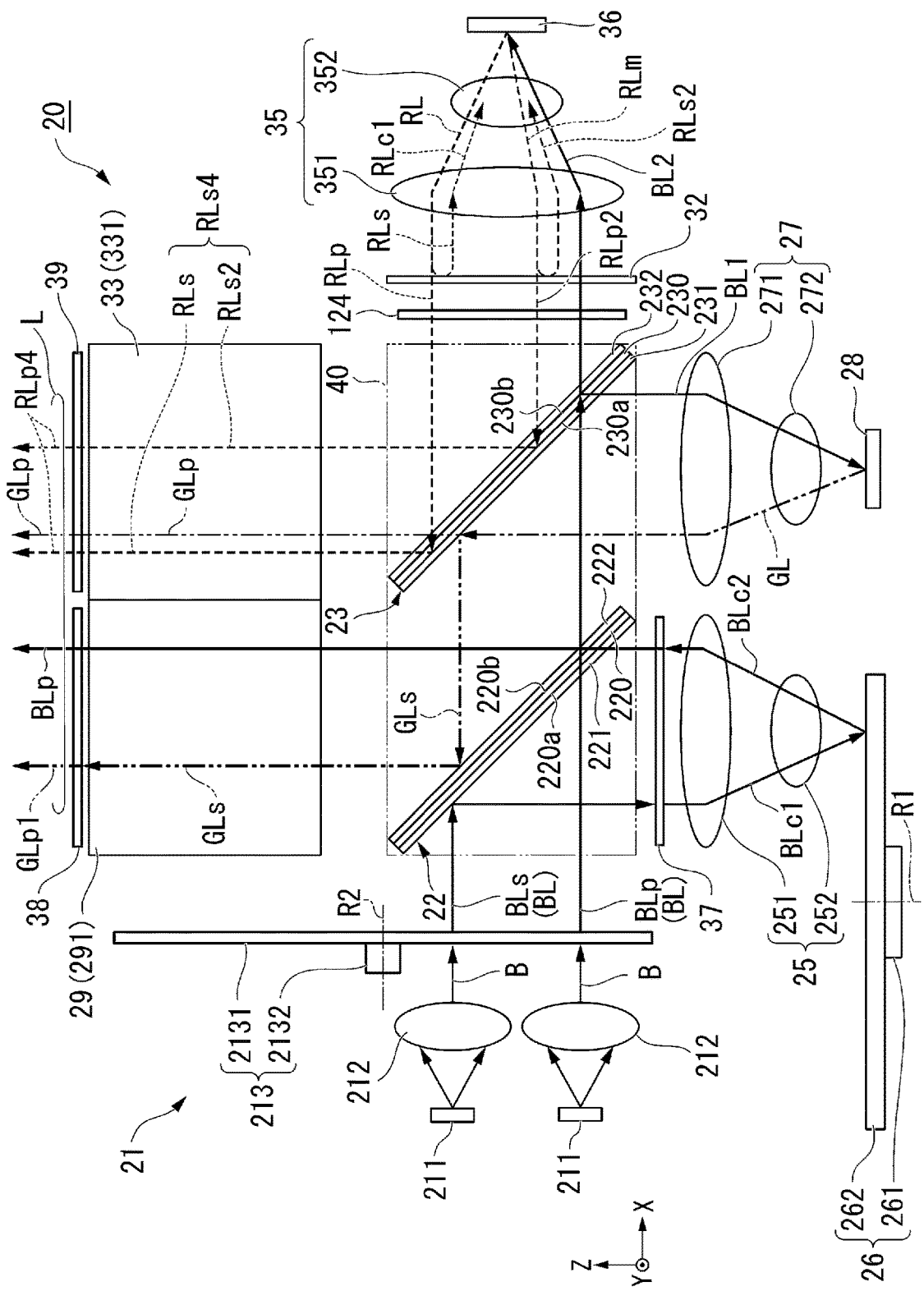
FIG. 11 is a plan view of key parts of the light source apparatus according to a second embodiment viewed in the direction +Y.

FIG. 11 is a plan view of key parts of the light source apparatus according to the second embodiment viewed in the direction +Y.

In FIG. 11, components common to those in the figures used in the first embodiment have the same reference characters and will not be described.

The light source apparatus 20 includes the light source section 21, the first optical member 22, the second optical member 23, the first light collector 25, the diffuser 26, a second light collector 27, the first wavelength converter 28, the third light collector 35, the second wavelength converter 36, the first color separator 29, the second color separator 33, a first retardation element 124, a reflective polarizer 32, the second retardation element 37, the fourth retardation element 38, the fifth retardation element 39, and the light tunnel 40, as shown in FIG. 11.

The first retardation element 124 in the present embodiment is provided between the second optical member 23 and the second wavelength converter 36. In the light source apparatus 20 according to the present embodiment, the reflective polarizer 32 is provided between the first retardation element 124 and the second wavelength converter 36.

The reflective polarizer 32 is disposed in a position shifted in the direction +X from the first retardation element 124. The reflective polarizer 32 is characterized in that it transmits light incident as the P-polarized component on the second optical member 23 and reflects light incident as the S-polarized component on the second optical member 23. Specifically, the reflective polarizer 32 is formed of a wire-grid polarizer in which a plurality of thin metal wires made, for example, of aluminum are provided across a surface of a base at minute intervals. In the present embodiment, the grid of the reflective polarizer 32 is oriented in the direction in which light formed of the P-polarized component is incident on the second optical member 23.

The excitation light BL2, which exits out of the second optical component 23 in the direction +X, is light formed of the P-polarized component. The excitation light BL2 can therefore pass through the reflective polarizer 32 and can be incident on the second wavelength converter 36 via the third light collector 35.

Out of the unpolarized red light RL emitted from the second wavelength converter 36, the P-polarized red light RLp passes through the reflective polarizer 32 and exits in the direction –X. On the other hand, out of the red light RL, the S-polarized red light RLs is reflected off the reflective polarizer 32 and caused to return to the second wavelength converter 36 via the third light collector 35.

Part of the red light RLs caused to return to the second wavelength converter 36 exits as the unpolarized red light RLm and is incident on the reflective polarizer 32 again via the third light collector 35. Out of the unpolarized red light RLm incident on the reflective polarizer 32, the P-polarized red light RLp2 passes through the reflective polarizer 32 and exits in the direction –X, and the S-polarized red light RLs2 is caused to return to the second wavelength converter 36 via the third light collector 35.

The other part of the red light RLs caused to return to the second wavelength converter 36 is reflected off the reflective polarizer 32 and returns to the second wavelength converter 36 because the polarization state of the other part of the red light RLs is not changed but the other part of the red light RLs remains as the S-polarized component when reflected off the surface of the second wavelength converter 36 or backscattered at the surface layer thereof.

The P-polarized red light RLp and red light RLp2 having exited out of the reflective polarizer 32 in the direction –X as described above are incident on the first retardation element 124.

The first retardation element 24 in the present embodiment is formed of a half-wave plate for the red wavelength band. The first retardation element 124 is formed of a wavelength-selective retardation element characterized in that it imparts a half retardation of the wavelengths in the red wavelength band to red light but no retardation to light having a wavelength band other than the red wavelength band, that is, blue light and green light. The wavelength-selective retardation element can specifically be ColorSelect (product name, manufactured by ColorLink Japan, Ltd.). The first retardation element 124 thus imparts the half retardation only to light having the red wavelength band. Therefore, when passing through the first retardation element 124, the excitation light BL2, which is light having the blue wavelength band, does not change its polarization state but passes through the reflective polarizer 32 as light formed of the P-polarized component and is incident on the second wavelength converter 36 as described above.

The red light RLp and red light RLp2 having exited out of the reflective polarizer 32 in the direction –X are converted by the first phase retardation element 124 into the S-polarized red light RLs and red light RLs2 and then incident on the second optical member 23. That is, the first retardation element 124 converts the polarization states of the red light RLp and the red light RLp2 incident thereon.

The red light RLs and the red light RLs2 incident on the second optical member 23 pass through the fourth optical layer 232 and the second transparent substrate 230 and are incident on the third optical layer 231. The S-polarized red light RLs and red light RLs2 are then reflected in the direction +Z.

Effects of Second Embodiment

The light source apparatus 20 according to the present embodiment further includes the first retardation element 124, which is provided between the second optical member 23 and the second wavelength converter 36 and imparts a half retardation to the red light RL. The light source apparatus 20 according to the present embodiment further includes the reflective polarizer 32, which is provided between the first retardation element 124 and the second wavelength converter 36, transmits the red light RLp emitted from the second wavelength converter 36 in the direction –X, and reflects the red light RLp emitted therefrom in the direction +X.

The light source apparatus 20 according to the present embodiment can generate the S-polarized red light RLs and red light RLs2 by causing the P-polarized red light RLp and red light RLp2 having an aligned direction produced by the reflective polarizer 32 to be incident on the first retardation element 124. The light source apparatus 20 according to the present embodiment allows the red light RLs and the red light RLs2 to exit as the red light RLs4 out of the second optical member in the direction +Z.

In the light source apparatus 20 according to the present embodiment, the P-polarized component of the red light RL can be caused to return toward the second wavelength converter 36 by the reflective polarizer 32 disposed in the vicinity of the third light collector 35. In this case, as compared with the light source apparatus 2 according to the first embodiment, in which the optical element 31 disposed between the second optical member 23 and the first optical member 22 causes the red light to return toward the second wavelength converter 36, the red light recycled efficiency can be increased because the red light is caused to return in a position closer to the second wavelength converter 36.

The present embodiment also provides the same effects as those provided by the first embodiment, for example, a light source apparatus 20 capable of outputting a plurality of color luminous fluxes having an aligned polarization direction can be achieved without using a small-interval polarization converter, and the light source apparatus 20 and the projector 1 can be reduced in size.

The technical scope of the present disclosure is not limited to the embodiments described above, and a variety of changes can be made thereto to the extent that the changes do not depart from the substance of the present disclosure.

In the embodiments described above, the first optical member 22 and the second optical member 23 are both formed of plate-shaped polarization separators by way of example. Instead, for example, the first optical member 22 and the second optical member 23 may be formed of a prism-shaped polarization separator that is the combination of two bases each having a substantially right-angled isosceles triangular columnar shape and includes an optical film formed at the interface between the two bases. When a prism-shaped polarization separator is used as the first optical member 22 and the second optical member 23, the light tunnel 40 is not required. One of the first optical member 22 and the second optical member 23 may instead be a prism-shaped optical member, and the other may be a plate-shaped optical member.

In the embodiments described above, the first optical layer 221 and the second optical layer 222 are provided at two surfaces of a single light-transmissive base. In place of the configuration described above, the first optical layer 221 and the second optical layer 222 may be provided at light-transmissive bases different from each other. For example, the first optical layer 221 may be provided at a first surface of a first light-transmissive base, an antireflection layer may be provided at a second surface of the first light-transmissive base that differs from the first surface, the second optical layer 222 may be provided at a third surface of a second light-transmissive base, an antireflection layer may be provided at a fourth surface of the second light-transmissive base that differs from the third surface, and the first optical layer 221 and the second optical layer 222 may be disposed so as to face each other. Similarly, the third optical layer 231 and the fourth optical layer 232 may be provided at light-transmissible bases different from each other.

The light source apparatuses 2 and 20 according to the embodiments described above each include the first light collector 25, the second light collector 27, and the third light collector 35. The configuration described above is, however, not necessarily employed, and at least any of the first light collector 25, the second light collector 27, and the third light collector 35 may not be provided.

The light source section 21 in each of the embodiments described above outputs the blue light BLs and BLp in the direction +X. The configuration described above is, however, not necessarily employed, and the light source section 21 may be configured to output the blue light BLs and BLp in a direction that intersects the direction +X, and the blue light BLs and BLp may be reflected, for example, off a reflection member and may then be incident on the first optical member 22 in the direction +X.

The projector in each of the embodiments described above includes the homogenizer 4 including the first multi-lens 41, the second multi-lens 42, and the superimposing lens 43. In place of the configuration described above, a homogenizer having another configuration may be provided, or the homogenizer 4 may not be provided.

The light source apparatuses 2 and 20 according to the embodiments described above each output color luminous fluxes via the four light exiting positions, and the liquid crystal panel 61, which forms the light modulator 6, has the four sub-pixels SX per pixel PX. In place of the configuration described above, the light source apparatuses 2 and 20 may each be configured to output three color luminous fluxes, and the liquid crystal panel may be configured to have three sub-pixels per pixel. In this case, for example, in the light source apparatus according to each of the embodiments described above, a total reflection member may be provided in the optical path of the green light GLp.

The light source apparatuses 2 and 20 according to the embodiments described above each output the green light GLp1, the blue light BLp, the red light RLp4, and the green light GLp, which are each P-polarized light and are spatially separated from one another. In place of the configurations described above, the color luminous fluxes outputted by each of the light source apparatuses may each have another polarization state. For example, the light source apparatuses may each be configured to output a plurality of spatially separated color luminous fluxes that are each S-polarized light.

In addition to the above, the specific descriptions of the shape, the number, the arrangement, the material, and other factors of each component of the light source apparatus and the projector are not limited to those in the embodiments described above and can be changed as appropriate. The aforementioned embodiments have each been described with reference to the case where the light source apparatus according to the present disclosure is incorporated in a projector, but not necessarily. The light source apparatus according to any of the forms of the present disclosure may also be used as a lighting apparatus, a headlight of an automobile, and other components.

A light source apparatus according to an aspect of the present disclosure may have the configuration below.

The light source apparatus according to the aspect of the present disclosure includes a light source section that outputs first light having a first wavelength band and containing light polarized in a first polarization direction and light polarized in a second polarization direction different from the first polarization direction, a first polarization separator that transmits in a first direction the first light polarized in the first polarization direction and incident from the light source section along the first direction and reflects in a second direction intersecting the first direction the first light polarized in the second polarization direction and incident from the light source section along the first direction, a second polarization separator that is disposed in a position shifted in the first direction from the first polarization separator, reflects in the second direction a portion of the first light polarized in the first polarization direction and incident from the first polarization separator along the first direction, and transmits in the first direction another portion of the first light polarized in the first polarization direction and incident from the first optical member along the first direction, a diffusion element that is disposed in a position shifted in the second direction from the first polarization separator, diffuses the first light incident from the first polarization separator along the second direction, and emits the diffused first light in a third direction opposite the second direction, a first wavelength converter that is disposed in a position shifted in the second direction from the second polarization separator, converts in terms of wavelength the portion of the first light incident from the second polarization separator along the second direction, and emits second light having a second wavelength band different from the first wavelength band in the third direction, and a second wavelength converter that is disposed in a position shifted in the first direction from the second polarization separator, converts in terms of wavelength the other portion of the first light incident from the second polarization separator along the first direction, and emits third light having a third wavelength band different from the first and second wavelength bands in a fourth direction opposite the first direction. The second polarization separator receives the second light from the first wavelength converter along the third direction, transmits in the third direction the second light polarized in the first polarization direction, and reflects in the fourth direction the second light polarized in the second polarization direction. The second polarization separator receives at least the third light polarized in the second polarization direction from the second wavelength converter along the fourth direction and reflects in the third direction the third light polarized in the second polarization direction. The first polarization separator transmits the first light emitted from the diffusion element along the third direction and reflects in the third direction the second light polarized in the second polarization direction and incident from the second polarization separator along the fourth direction.

The light source apparatus according to the aspect of the present disclosure may further include an optical element that reflects in the first direction the third light polarized in the first polarization direction, having passed through the second polarization separator, and incident on the optical element along the fourth direction.

The light source apparatus according to the aspect of the present disclosure may further include a first retardation element that is provided between the second polarization separator and the second wavelength converter and imparts a quarter retardation of the wavelengths in the third wavelength band to the third light.

The light source apparatus according to the aspect of the present disclosure may further include a first retardation element that is provided between the second polarization separator and the second wavelength converter and imparts a half retardation of the wavelengths in the third wavelength band to the third light.

The light source apparatus according to the aspect of the present disclosure may further include a reflective polarizer that is provided between the first retardation element and the second wavelength converter, transmits in the fourth direction the third light polarized in the first polarization direction out of the third light emitted from the second wavelength converter, and reflects in the first direction the third light polarized in a direction different from the first polarization direction.

The light source apparatus according to the aspect of the present disclosure may further include a second retardation element that is provided between the first polarization separator and the diffusion element and on which the first light polarized in the second polarization direction is incident from the first polarization separator along the second direction.

In the light source apparatus according to the aspect of the present disclosure, the light source section may include a light emitter that outputs light having the first wavelength band and a third retardation element on which the light outputted from the light emitter is incident and out of which the first light exits.

In the light source apparatus according to the aspect of the present disclosure, the third retardation element may be rotatable around an axis of rotation along the traveling direction of the light incident on the third retardation element.

The light source apparatus according to the aspect of the present disclosure may further include a first mirror disposed in a position shifted in a fifth direction intersecting the first, second, third, and fourth directions from the first and second polarization separators and a second mirror provided so as to face the first mirror and disposed in a position shifted in a sixth direction opposite the fifth direction from the first and second polarization separators.

The light source apparatus according to the aspect of the present disclosure may further include a first color separator that is disposed in a position shifted in the third direction from the first polarization separator and separates the light having exited out of the first polarization separator into fourth light having the second wavelength band and fifth light having the first wavelength band and a second color separator that is disposed in a position shifted in the third direction from the second polarization separator and separates the light having exited out of the second polarization separator into sixth light having the third wavelength band and seventh light having the second wavelength band.

A projector according to another aspect of the present disclosure may have the configuration below.

A projector according to the other aspect of the present disclosure includes the light source apparatus according to the aspect of the present disclosure, a light modulator that modulates light from the light source apparatus in accordance with image information, and a projection optical apparatus that projects the light modulated by the light modulator.

The projector according to the other aspect of the present disclosure may further include a homogenizer provided between the light source apparatus and the light modulator, and the homogenizer may include two multi-lenses that divide the light incident from the light source apparatus into a plurality of sub-luminous fluxes and a superimposing lens that superimposes the plurality of sub-luminous fluxes incident from the two multi-lenses on the light modulator.

In the projector according to the other aspect of the present disclosure, the light modulator may include a liquid crystal panel having a plurality of pixels and a microlens array provided on the light incident side of the liquid crystal panel and including a plurality of microlenses corresponding to the plurality of pixels. The plurality of pixels may each include a first sub-pixel, a second sub-pixel, a third sub-pixel, and a fourth sub-pixel. The microlenses may each cause the fourth light to be incident on the first sub-pixel, the fifth light to be incident on the second sub-pixel, the sixth light to be incident on the third sub-pixel, and the seventh light to be incident on the fourth sub-pixel.

What is claimed is:

1. A light source apparatus comprising:
a light source section that outputs first light having a first wavelength band and containing light polarized in a first polarization direction and light polarized in a second polarization direction different from the first polarization direction;
a first polarization separator that transmits in a first direction the first light polarized in the first polarization direction and incident from the light source section along the first direction and reflects in a second direction intersecting the first direction the first light polarized in the second polarization direction and incident from the light source section along the first direction;
a second polarization separator that is disposed in a position shifted in the first direction from the first polarization separator, reflects in the second direction a portion of the first light polarized in the first polarization direction and incident from the first polarization separator along the first direction, and transmits in the first direction another portion of the first light polarized in the first polarization direction and incident from the first optical member along the first direction;
a diffusion element that is disposed in a position shifted in the second direction from the first polarization separator, diffuses the first light incident from the first polarization separator along the second direction, and emits the diffused first light in a third direction opposite the second direction;
a first wavelength converter that is disposed in a position shifted in the second direction from the second polarization separator, converts in terms of wavelength the portion of the first light incident from the second polarization separator along the second direction, and emits second light having a second wavelength band different from the first wavelength band in the third direction; and
a second wavelength converter that is disposed in a position shifted in the first direction from the second polarization separator, converts in terms of wavelength the other portion of the first light incident from the second polarization separator along the first direction, and emits third light having a third wavelength band different from the first and second wavelength bands in a fourth direction opposite the first direction,
wherein the second polarization separator receives the second light from the first wavelength converter along the third direction, transmits in the third direction the second light polarized in the first polarization direction, and reflects in the fourth direction the second light polarized in the second polarization direction, the second polarization separator receives at least the third light polarized in the second polarization direction from the second wavelength converter along the fourth direction and reflects in the third direction the third light polarized in the second polarization direction, and the first polarization separator transmits the first light emitted from the diffusion element along the third direction and reflects in the third direction the second light polarized in the second polarization direction and incident from the second polarization separator along the fourth direction.

2. The light source apparatus according to claim 1, further comprising an optical element that reflects in the first direction the third light polarized in the first polarization direction, passing through the second polarization separator, and incident on the optical element along the fourth direction.

3. The light source apparatus according to claim 2, further comprising a first retardation element that is provided between the second polarization separator and the second wavelength converter and imparts a quarter retardation of wavelengths in the third wavelength band to the third light.

4. The light source apparatus according to claim 1, further comprising a first retardation element that is provided between the second polarization separator and the second wavelength converter and imparts a half retardation of wavelengths in the third wavelength band to the third light.

5. The light source apparatus according to claim 4, further comprising a reflective polarizer that is provided between the first retardation element and the second wavelength converter, transmits in the fourth direction the third light polarized in the first polarization direction out of the third light emitted from the second wavelength converter, and reflects in the first direction the third light polarized in the second polarization direction.

6. The light source apparatus according to claim 1, further comprising a second retardation element that is provided between the first polarization separator and the diffusion element and on which the first light polarized in the second polarization direction is incident from the first polarization separator along the second direction.

7. The light source apparatus according to claim 1, wherein the light source section includes a light emitter that outputs light having the first wavelength band and a third retardation element on which the light outputted from the light emitter is incident and out of which the first light exits.

8. The light source apparatus according to claim 7, wherein the third retardation element is rotatable around an axis of rotation along a traveling direction of the light incident on the third retardation element.

9. The light source apparatus according to claim 1, further comprising:
a first mirror disposed in a position shifted in a fifth direction intersecting the first, second, third, and fourth directions from the first and second polarization separators; and
a second mirror provided so as to face the first mirror and disposed in a position shifted in a sixth direction opposite the fifth direction from the first and second polarization separators.

10. The light source apparatus according to claim 1, further comprising:
a first color separator that is disposed in a position shifted in the third direction from the first polarization separator and separates light that exits out of the first polarization separator into fourth light having the second wavelength band and fifth light having the first wavelength band, and
a second color separator that is disposed in a position shifted in the third direction from the second polarization separator and separates light that exits out of the second polarization separator into sixth light having the third wavelength band and seventh light having the second wavelength band.

11. A projector comprising:
the light source apparatus according to claim 10;
a light modulator that modulates light from the light source apparatus in accordance with image information; and
a projection optical apparatus that projects the light modulated by the light modulator.

12. The projector according to claim 11, further comprising a homogenizer provided between the light source apparatus and the light modulator, wherein the homogenizer includes
two multi-lenses that divide the light incident from the light source apparatus into a plurality of sub-luminous fluxes, and
a superimposing lens that superimposes the plurality of sub-luminous fluxes incident from the two multi-lenses on the light modulator.

13. The projector according to claim 12, wherein the light modulator includes a liquid crystal panel having a plurality of pixels and a microlens array provided on a light incident side of the liquid crystal panel and including a plurality of microlenses corresponding to the plurality of pixels,
the plurality of pixels each include a first sub-pixel, a second sub-pixel, a third sub-pixel, and a fourth sub-pixel, and
the microlenses each cause the fourth light to be incident on the first sub-pixel, the fifth light to be incident on the second sub-pixel, the sixth light to be incident on the third sub-pixel, and the seventh light to be incident on the fourth sub-pixel.

* * * * *